(12) United States Patent
Gowa

(10) Patent No.: US 10,687,476 B2
(45) Date of Patent: Jun. 23, 2020

(54) AUTOMATED PLANT TRIMMER

(71) Applicant: Bloom Automation, Inc., Woburn, MA (US)

(72) Inventor: Jon Thomas Gowa, Medford, MA (US)

(73) Assignee: Bloom Automation, Inc., Woburn, MA (US)

( * ) Notice: Subject to any disclaimer, the term of this patent is extended or adjusted under 35 U.S.C. 154(b) by 142 days.

(21) Appl. No.: 15/700,755

(22) Filed: Sep. 11, 2017

(65) Prior Publication Data
US 2019/0075732 A1 Mar. 14, 2019

(51) Int. Cl.
| A01G 3/08 | (2006.01) |
| B23K 26/03 | (2006.01) |
| A01B 69/04 | (2006.01) |
| A01G 5/00 | (2006.01) |

(52) U.S. Cl.
CPC .............. A01G 3/08 (2013.01); A01B 69/008 (2013.01); A01G 5/00 (2013.01); B23K 26/032 (2013.01); *G05B 2219/45003* (2013.01)

(58) Field of Classification Search
USPC ...................................................... 47/1.43, 4
See application file for complete search history.

(56) References Cited

U.S. PATENT DOCUMENTS

| 6,302,264 | B1 * | 10/2001 | Truffaux | ................ A01D 45/00 |
| | | | | 198/626.1 |
| 8,568,821 | B2 * | 10/2013 | Kurth | ..................... A23N 15/06 |
| | | | | 427/4 |
| 9,226,446 | B2 | 1/2016 | Moore | |
| 9,468,152 | B1 | 10/2016 | Jens et al. | |
| 9,974,235 | B2 * | 5/2018 | Van De Vegte | ....... A01G 18/00 |
| 10,278,333 | B2 * | 5/2019 | Shen | ......................... A01G 3/08 |
| 2004/0074217 | A1 | 4/2004 | Reaux | |
| 2006/0112619 | A1 * | 6/2006 | Oderwald | ................ A01G 7/00 |
| | | | | 47/1.7 |
| 2011/0022231 | A1 | 1/2011 | Walker et al. | |
| 2014/0030394 | A1 * | 1/2014 | Pryor | ................... A23N 15/003 |
| | | | | 426/231 |
| 2015/0082695 | A1 | 3/2015 | Rodel et al. | |
| 2015/0316451 | A1 | 11/2015 | Sercel et al. | |
| 2016/0057940 | A1 * | 3/2016 | Lyons | .................... A01D 46/30 |
| | | | | 47/1.43 |
| 2017/0188523 | A1 * | 7/2017 | Black | ....................... A01G 3/08 |
| 2018/0220589 | A1 * | 8/2018 | Burden | .................... A01G 3/02 |

FOREIGN PATENT DOCUMENTS

CN          205030140 U     2/2016

* cited by examiner

*Primary Examiner* — Andrea M Valenti
(74) *Attorney, Agent, or Firm* — Faegre Drinker Biddle & Reath LLP

(57) ABSTRACT

The automated trimming of an untrimmed plant stem comprises a device for transporting an untrimmed plant stem to an imaging stage, using a camera to capture at least one image of the plant stem, sending the at least one image to a central processor which creates a trim map which constructs a pattern for moving a cutting armature along the plant stem, and trimming the plant stem by cutting structure of the cutting armature to change the untrimmed plant stem to a trimmed plant stem.

8 Claims, 23 Drawing Sheets

AUTOMATED PLANT TRIMMER

FIELD OF INVENTION

The present invention relates generally to the field of automated pruning and trimming of plants and crops such as (but not limited to) *Cannabis sativa* and *Cannabis indica* ("*cannabis*"). More specifically, but without limitation, embodiments of the present invention include machines, apparatuses, systems and methods for automated or robotic scanning, mapping, picking, pruning, trimming, manipulating and detecting diseases or parasites associated with agricultural crops, including without limitation *cannabis*.

BACKGROUND

After the growing phase is complete, *cannabis* plants are harvested by trimming off branches that include a long, central stem, large "fan" leaves (also called water leaves), and a cola (also called a bud or flower), in which numerous smaller leaves (called sugar leaves) are also interspersed. The next step in the harvest process is the removal of fan leaves and sugar leaves, either before or during the drying process, so that what is left are the parts of the plant—the buds or flowers, including trichomes (see below)—containing a higher concentration of active compounds, primarily tetrahydrocannabinol (THC), cannabidiol (CBD) and numerous other cannabinoids. These active compounds are particularly concentrated in the flower and in the nearly microscopic, translucent resin glands on the flower surface called trichomes. The trichomes and the flower are delicate structures and easily damaged or broken through handling. Thus, one objective of the trimming process is to remove as many of the low-cannabinoid leaves as possible without damaging or removing the high-cannabinoid flower and trichomes.

The trimming process has been traditionally accomplished using manual labor, in which an individual uses a pair of small scissors to cut away the fan leaves, sugar leaves and other low-cannabinoid parts of the plant. Manual trimming, however, is slow, monotonous, imprecise, expensive and exposes valuable (and otherwise tightly controlled) inventories of *cannabis* flowers to theft by workers and damage in the trimming process.

In response to these drawbacks (including but not limited to damage to trichomes, tedious manual labor, damage to the product, reduction in product margins and shrinkage through theft), various mechanical devices have been created to trim harvested plants, including the TRIMPRO Rotor XL (www.trimpro.com), the CENTURION PRO Silver Bullet (www.cprosolutions.com), the TWISTER T4 (www.twistertrimmer.com), the ULTRATRIMMER (www.ultratrimmer.com), the GreenBroz (www.greenbroz.com) and the THUNDERVAK Composter Plus. All are similar in operation—a rotating, reciprocating or stationary chamber containing the harvested *cannabis* stalks includes small slits or gaps in which—theoretically, but not in practice—only fan and sugar leaves (but not other parts of the plant) can slip easily, and behind each slit or gap is a mechanical cutting edge. The stalks are rotated or agitated inside the chamber, and with each cycle, the stalks come into contact with the slits, protruding leaves are sheared off, and the process repeats until complete. In practice, mechanical trimming with these machines results in over-trimming of the harvested stalk and significant damage to the flower and trichomes, which renders the most valuable parts of the plant useless and converted into waste.

For other agricultural applications, computer-controlled crop pickers, harvesters and trimmers have been created—for example, U.S. Pat. No. 9,226,446, to Moore ("Robotic Fruit Tree Pruner and Harvester Machine") and U.S. Pat. Pub. No. 2011/0022231 to Walker et al. ("Apparatuses, Systems and Methods for Automated Crop Picking"). Both references disclose machine-vision systems coupled with computer-controlled mechanical armatures for pruning and harvesting fruit and other tree-borne crops. These devices, however, lack numerous features required or advantageous for the trimming of *cannabis* stalks, as described in greater detail below.

Specifically, the use of computer-vision for trimming plants and other agricultural products presents a unique challenge. In a typical computer-vision application, the central processor is programmed with instructions to search for and compare certain shapes, sizes and colors against a library of reference images, which permit the machine to "recognize" certain parts or features and act upon them. When working with plants and crops, however, reference images are far less useful because of wide variations in the natural shape, color and location of leaves, stalks, flowers, buds and other plant parts. Therefore, a different approach to computer-vision is beneficial.

SUMMARY

According to the present invention, there is provided an automated trimming device including a transport mechanism, a cutting support mechanism, a camera and imaging stage and a cutting armature or cutting laser in communication with a central processor.

The transport mechanism includes a series of cars mounted to a mechanically driven conveyor system for moving untrimmed plant stems from a supply source into an appropriate position adjacent to the cutting support mechanism for trimming. The cutting support mechanism includes a platform for supporting the untrimmed plant stem while the stem is imaged and trimmed. The camera and imaging stage are positioned to capture at least one image of the plant stem in its untrimmed state and, from that at least one image, the central processor computes an appropriate map for trimming the stem. The central processor then uses the trim map to guide the cutting armature into various positions for trimming the plant stem.

DETAILED DESCRIPTION OF THE PREFERRED EMBODIMENTS

Figure 1:
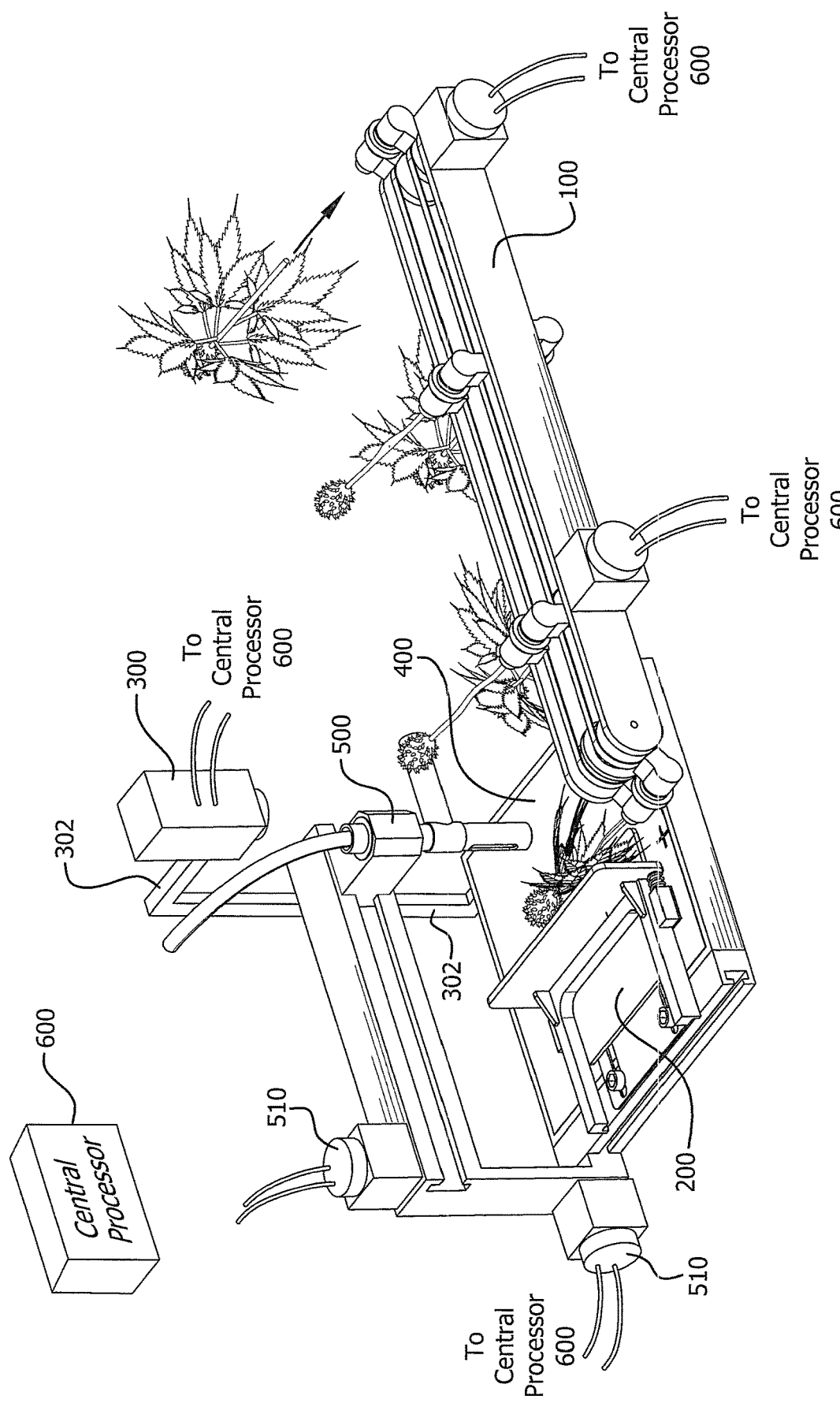
FIG. 1 is a front perspective view of an exemplary embodiment of an automated plant trimmer.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components and materials have not been described in detail so as not to unnecessarily obscure aspects of the present invention.

The invention, in its various aspects, will be explained in greater detail below with regard to exemplary embodiments. References to the drawings include reference characters designating like or corresponding parts throughout several views.

Figure 4:
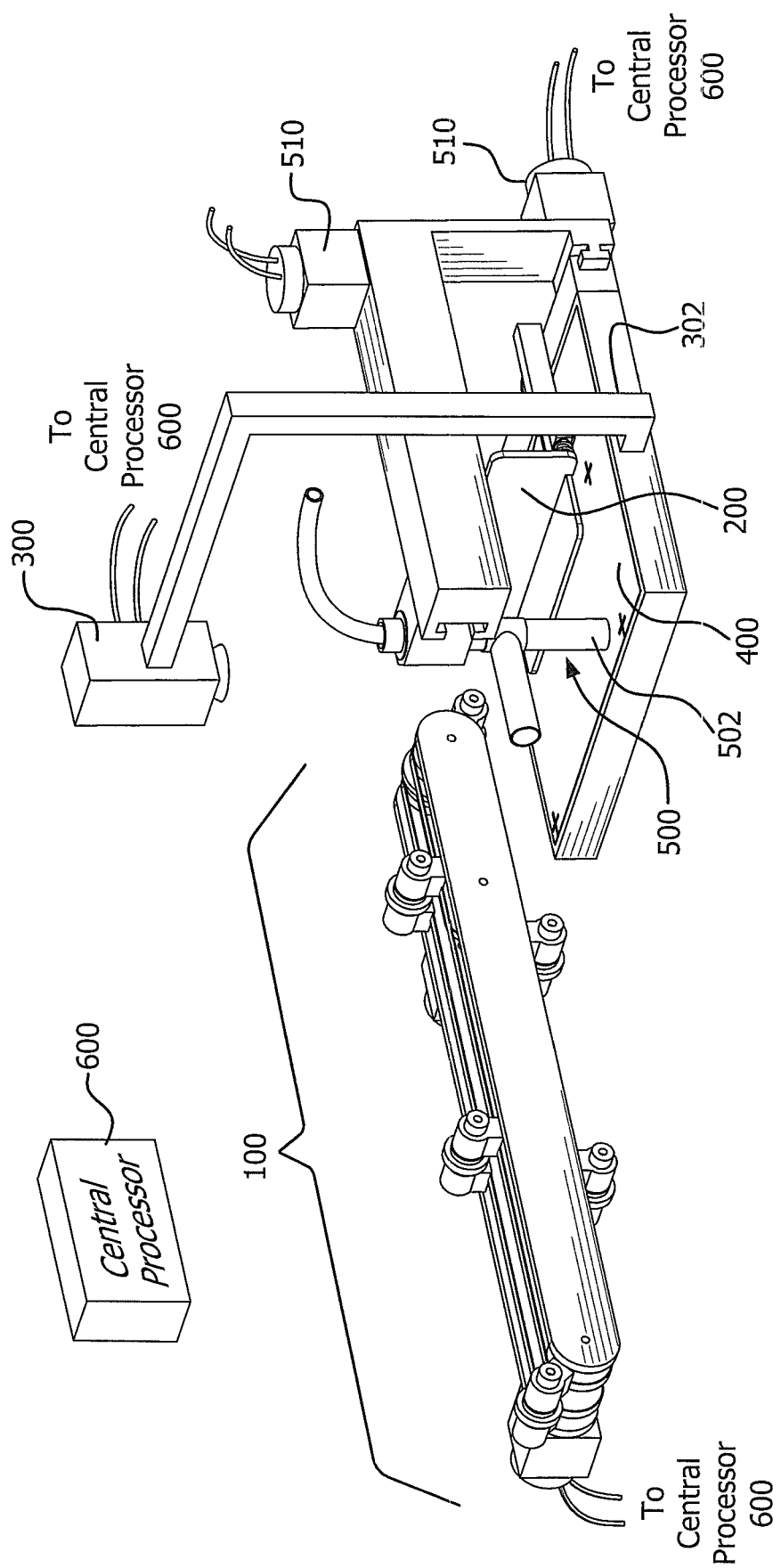
FIG. 4 is a side perspective view of several portions of an exemplary embodiment of an automated plant trimmer—in particular, exemplary embodiments of a transport mechanism, cutting support mechanism, camera, imaging stage, cutting armature and central processor.

As illustrated in FIGS. 1 and 4, the embodiment depicted in the attached FIGS. includes the following principal structures, each described in greater detail below: a transport mechanism 100, a cutting support mechanism 200, a camera 300 and imaging stage 400, a cutting armature 500 and a central processor 600. The central processor 600 may be an Intel® Core i7 processor or a Jetson TX2 GPU based computer, for example running Microsoft® Windows or Linux and National Instruments LabVIEW system design programming environment or another programming language such as ROS (Robot Operating System), C++, Python, OpenCV or a similar language.

The embodiment depicted in the attached FIGS. 1-4 is a robotic transport and plant trimming system that uses data gathered by the camera 300 and other sensors and instructions provided by a central processor 600 (or some intermediate device in communication with the central processor) to guide a cutting armature 500. Additional data may also be provided by capacitive, resistive, touch and pressure sensors, which can detect plant water content, physical resistance to the cutting armature, and other physical qualities, among other things. Additionally, the cutter may or may not be mechanical in nature, and may include a $CO_2$ or other laser source, guided by either a gantry or an articulated mirror.

Figure 2:
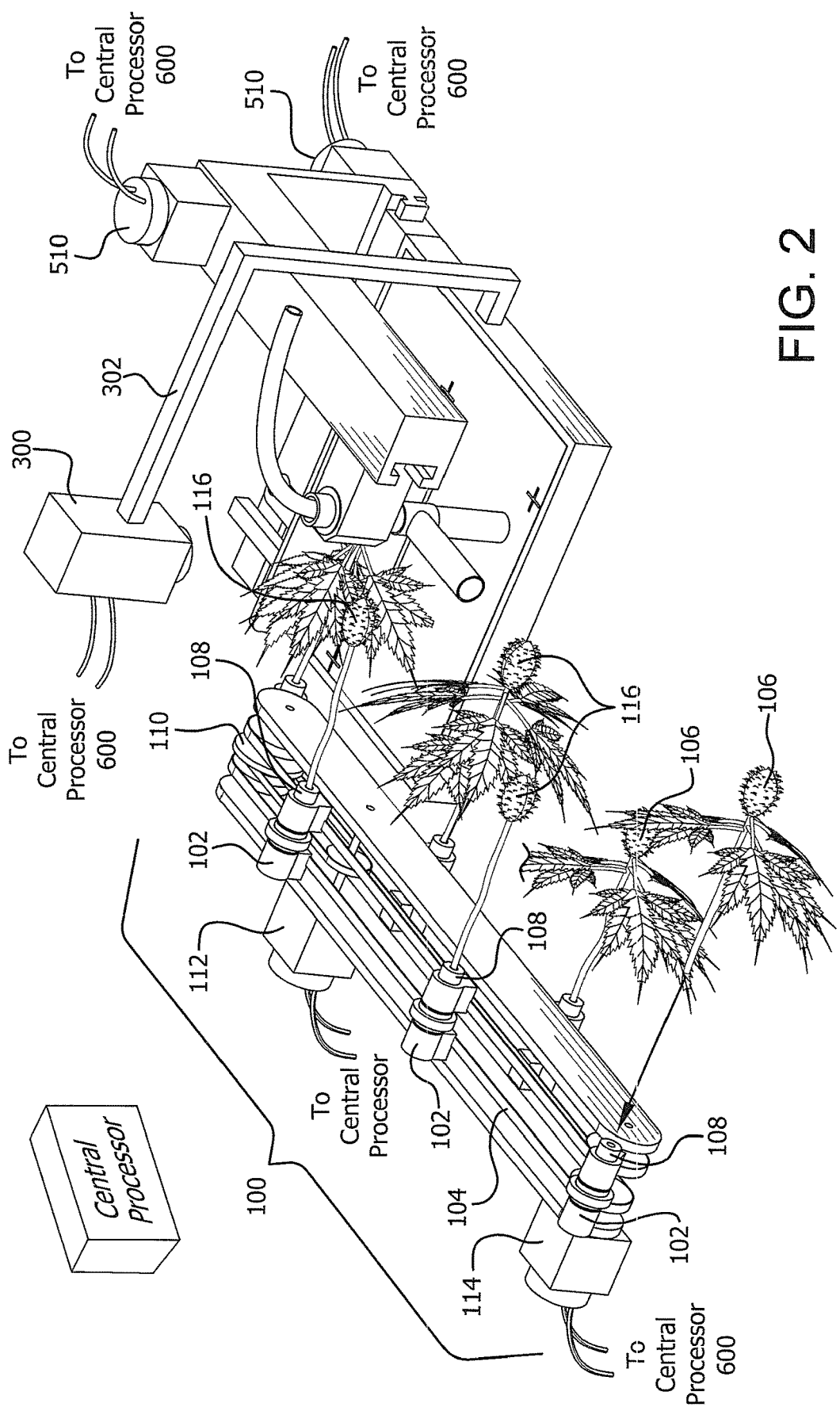
FIG. 2 is a side perspective view of an exemplary embodiment of an automated plant trimmer.
Figure 3:
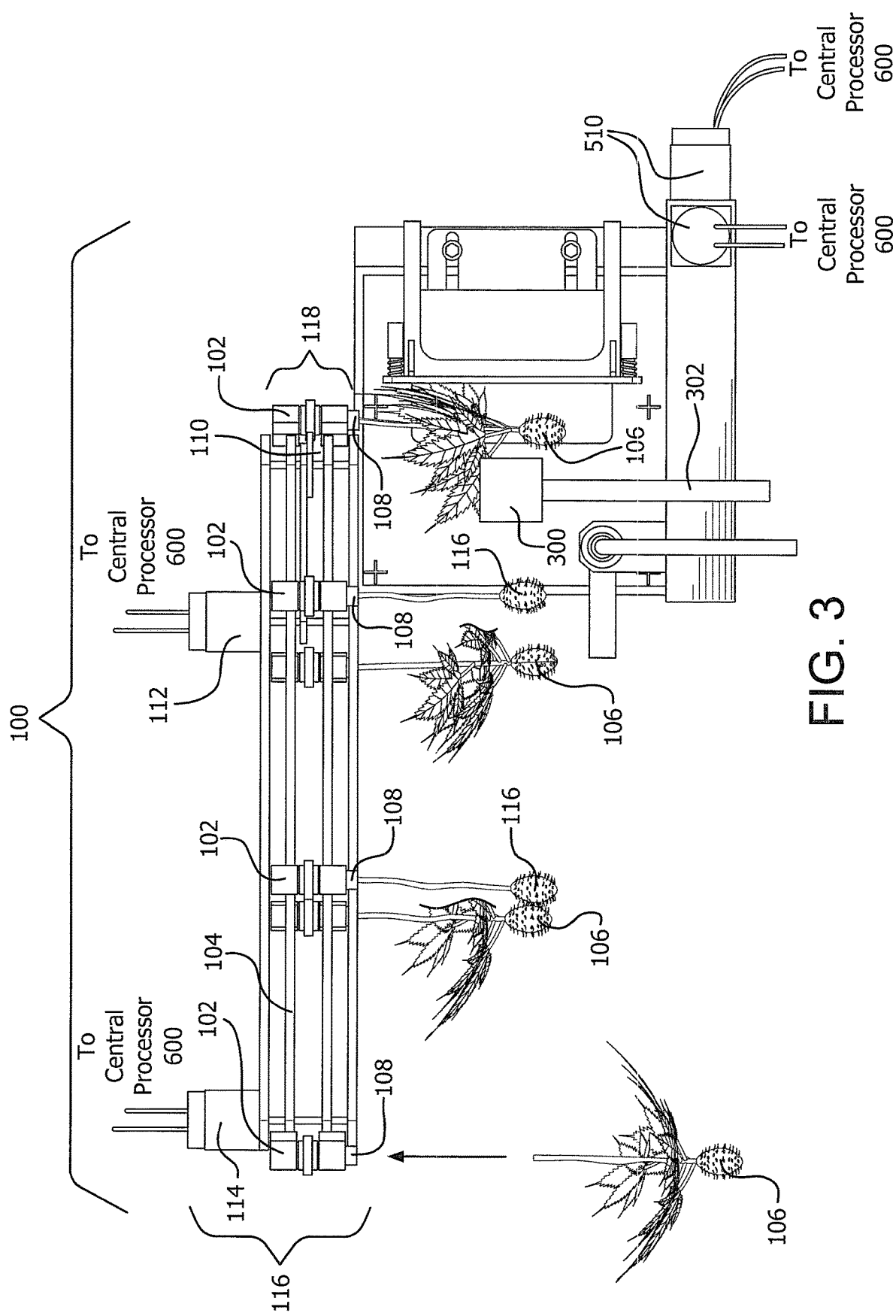
FIG. 3 is a top view of an exemplary embodiment of an automated plant trimmer.
Figure 12:
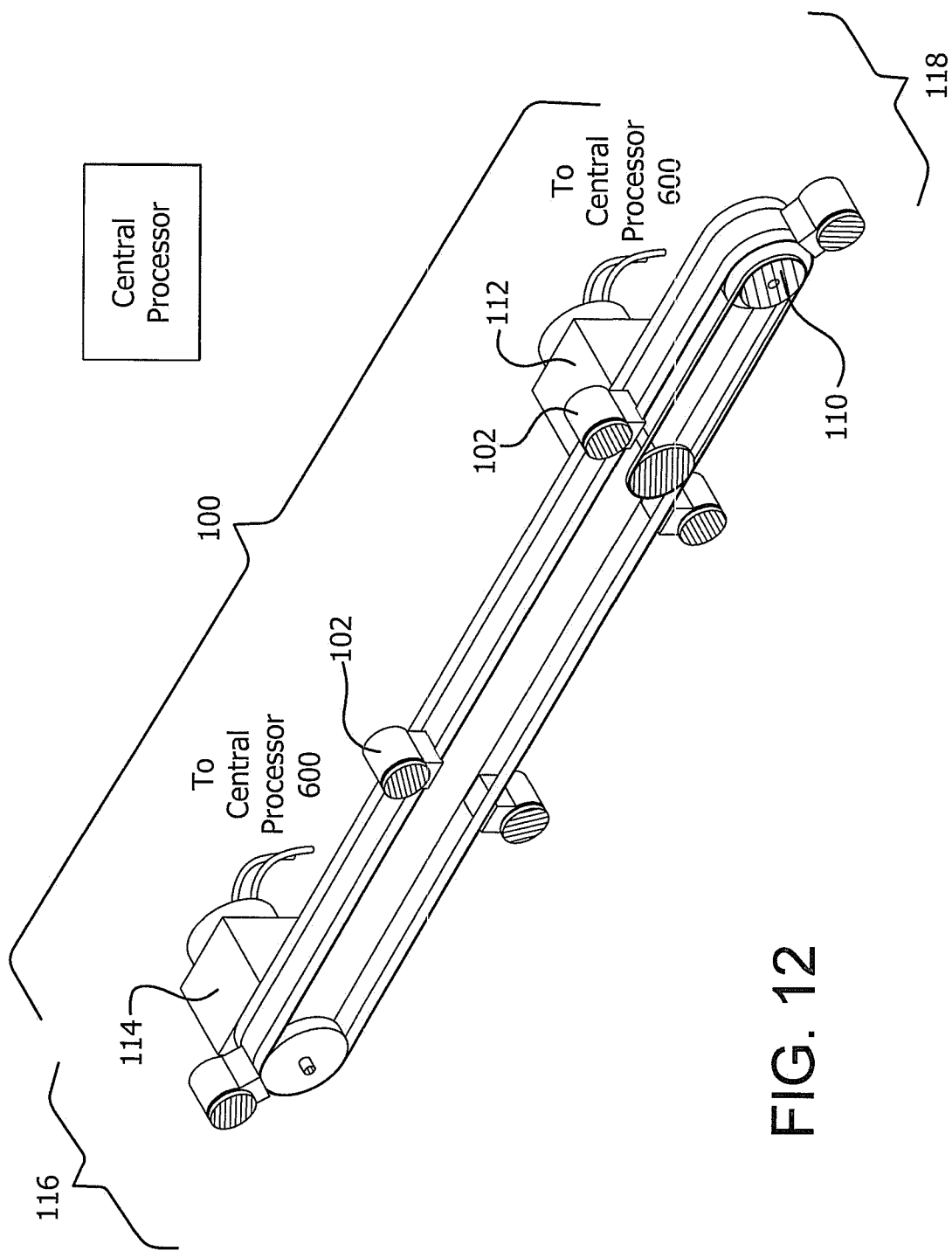
FIG. 12 is a cutaway view of an exemplary embodiment of a transport mechanism.

As illustrated in FIGS. 2, 3 and 12, the transport mechanism 100 includes a series of cars 102 mounted to a mechanically driven conveyor system 104. Each car 102 holds one or more plant stems 106 in a rotatable chuck or collar 108 for gripping and supporting the plant stem or stems as the car 102 travels along the conveyor system 104 and into the correct position for plant trimming. The chuck 108 rotates along an axis that corresponds approximately to the long axis of the plant stem or stems mounted in the chuck. The chuck's rotation is driven through a friction or gear wheel system 110 that engages a drivewheel when the car is positioned in the plant-trimming position. The drivewheel is driven by a motor 112 controlled by electrical signals or instructions received from a central processor 600 (or some intermediate device in communication with the central processor). The conveyor system is also driven by a motor 114 controlled by electrical signals or instructions received from the central processor 600 (or some intermediate device in communication with the central processor). An untrimmed plant 106 stem may be loaded into each chuck 108 by hand or using an automatic loading mechanism, which would include jaws or fingers for gripping an individual plant stem from a hopper or other form of supply system, pushing it into the opening of an available chuck and then releasing the plant stem. Automated loading of a plant stem or stems may also be accomplished through other methods and mechanisms known in the art, including but not limited to the use of an automated six-axis robotic armature, in an agitated hopper, using automated branch identification and picking and similar devices.

As illustrated in FIGS. 5, 6, 8, 9 and 10, the cutting support mechanism 200 includes a platform 202, preferably made from a transparent or translucent material, or a substrate suitable for laser cutting of the supported material, for supporting the untrimmed stem 106 (with all of the attached leaves and flowers) during the imaging and cutting process. The plant stems 106 are expected to be of differing weights, lengths and stiffness, and so it is difficult to predict the direction and extent a given plant stem will droop or bend as it is moved into the plant-trimming position. A significantly drooping or bending plant stem, in turn, makes the process of imaging and trimming more difficult, as the areas to be trimmed are more easily distinguished and trimmed when the plant stem is approximately perpendicular to the cutting armature 500. The platform 202 is preferably transparent or translucent to enable light to illuminate the plant stem from below the platform, thereby creating a more accurate image of the plant stem in the system's camera. The platform is also preferably mounted slidably, with a spring-driven bias mechanism 204 holding the platform in the most extended position. As shown in FIGS. 6, 8, 9, 10, 11A, 11B and 11C, this spring-biased slide mechanism 204 enables the platform 202 to retract as the cutting armature 500 moves closer to the plant stem 106 and pushes the platform 202 out of the way. The plant stem 106 does not droop or bend when the cutting armature 500 is engaged in cutting at a close distance, because the cutting armature 500 itself provides a small amount of support to the plant stem 106 as the cutting occurs. Once the cutting process is finished and the cutting armature 500 retracts, releasing pressure on the support platform 202, the platform 202 slides back to its most extended position, again supporting the length of the plant stem in the correct orientation. There is also a flat plate or fence 206 positioned perpendicular to the support platform 202 that provides a boundary or stop for ensuring that the plant stem 106 does not get pushed out of position during the cutting process. Other supporting platforms may also be used to hold the plant stem in the correct orientation, including platforms made from non-transparent materials, platforms made from perforated, hex-pattern materials or other materials conducive to laser cutting, platforms made from light-emitting materials and platforms that are fixed rather than slidably mounted. Furthermore, there may be no supporting platform in the device if, for example, the plant stem is oriented vertically and suspended from above, as shown in the embodiment in FIGS. 22 to 26. This embodiment is discussed separately below.

Figure 13:
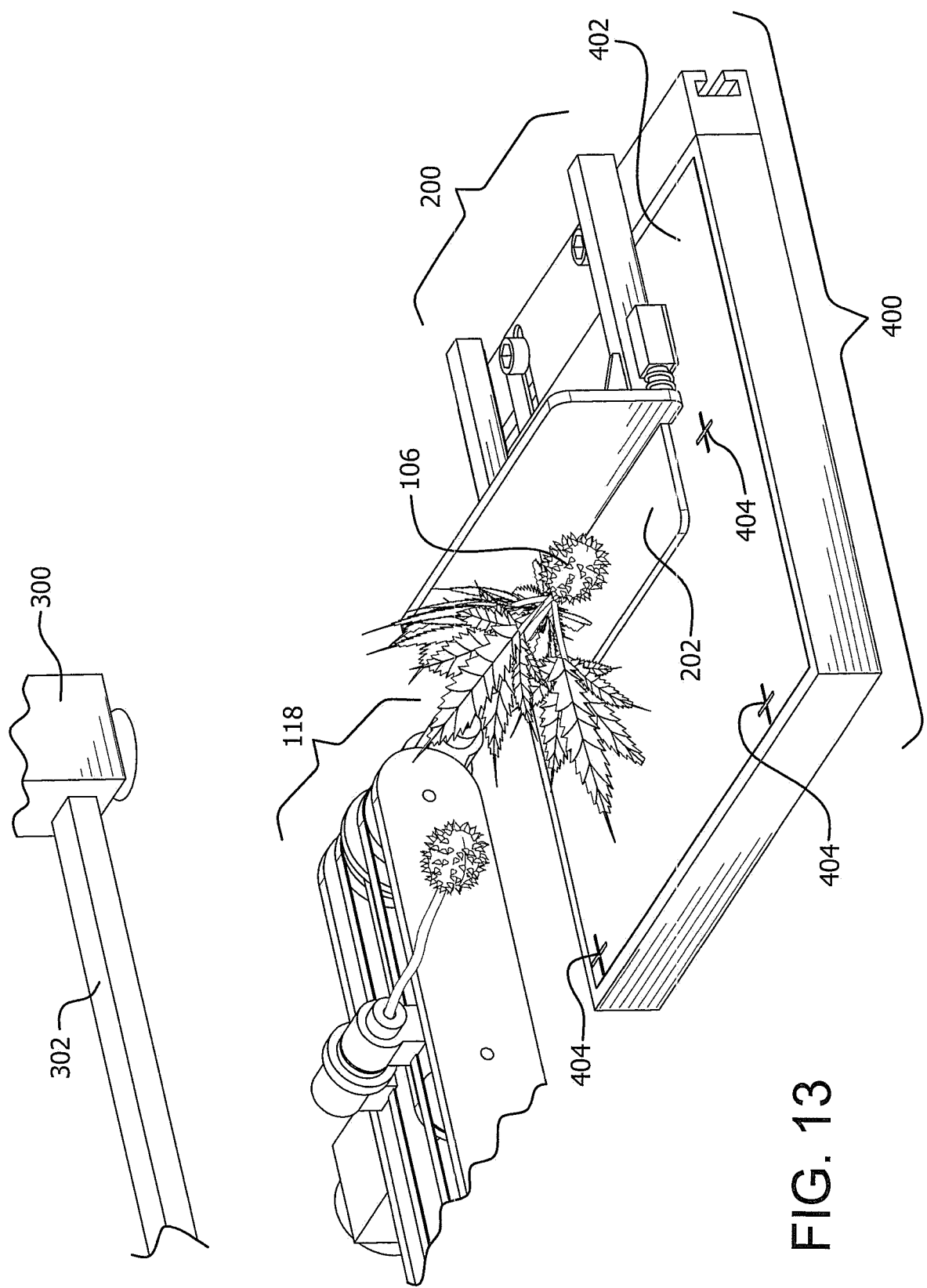
FIG. 13 is a detail view of an exemplary embodiment of a transport mechanism, camera, cutting support mechanism and imaging stage.

As shown in FIG. 13, the camera 300 and imaging stage 400 are positioned, for purpose of capturing at least one image, immediately above and below the plant stem 106 and support platform 200 when the stem 106 is in the correct plant-trimming position. Other images from different angles may also be captured to improve the detail and accuracy of the trimming process. Additionally, the camera 300 can be mounted on the end of the cutting armature 500 in the form of a 6-axis arm, as shown in FIGS. 22 to 26. This embodiment is discussed separately below. The camera 300 is a typical electronic sensor camera with a digital image output, such as a camera with a CCD or CMOS image sensor. Preferably, the camera 300 may be a high resolution (megapixel) monochrome or chromatic machine vision camera and may be augmented by a second, higher quality camera, a 3-D camera or hyperspectral camera, structured light, laser sensor, or LIDAR sensor for improved detail, image and pixel size. The camera 300 may be mounted to a stationary armature 302 and primarily positioned so that the camera is pointed in a direction approximately perpendicular to the axis of the plant stem to be trimmed. The camera 300 or a secondary camera may be mounted on the non-stationary cutting armature or a separate moving armature or robot arm to provide additional views of the plant stem 106. Below (or behind, if the plant stem is oriented vertically) the plant stem is the imaging stage 400. The imaging stage 400 includes a backlighted surface 402 for illuminating the plant stem to be imaged and trimmed and several reference markers 404 to be used by the imaging software for determining the exact position of the plant stem 106 and the cutting armature 500 on the imaging stage 400. A backlighted surface 402 may transmit at a specific wavelength or color to properly differentiate the plant, for example a blue or white light. Additionally, the backlighted surface 402 may be augmented or replaced by a front light, ultraviolet light, infrared light, LED, quartz halogen, fluorescent, xenon strobe or any other form of light source. The support platform 202 is positioned between the plant stem and the imaging stage, but its position in this location does not interfere with the image capture process, as the support platform 202 is preferably made from a transparent or translucent material. Other arrangements of lighting position, camera position and imaging stage such that the plant stem is well lit and visible to the camera's lens are also possible, including the removal of the platform, and the arrangement of the plant stem in a vertical orientation, as in FIGS. 22 to 26, or any other orientation, including on a moving or stationary conveyor. The lighting system may also use other forms of filtered, colored or specialized lighting, such as infrared filtering, ultraviolet filtering, laser or coherent light sources or other forms of light beneficial for image capture.

Figure 6:
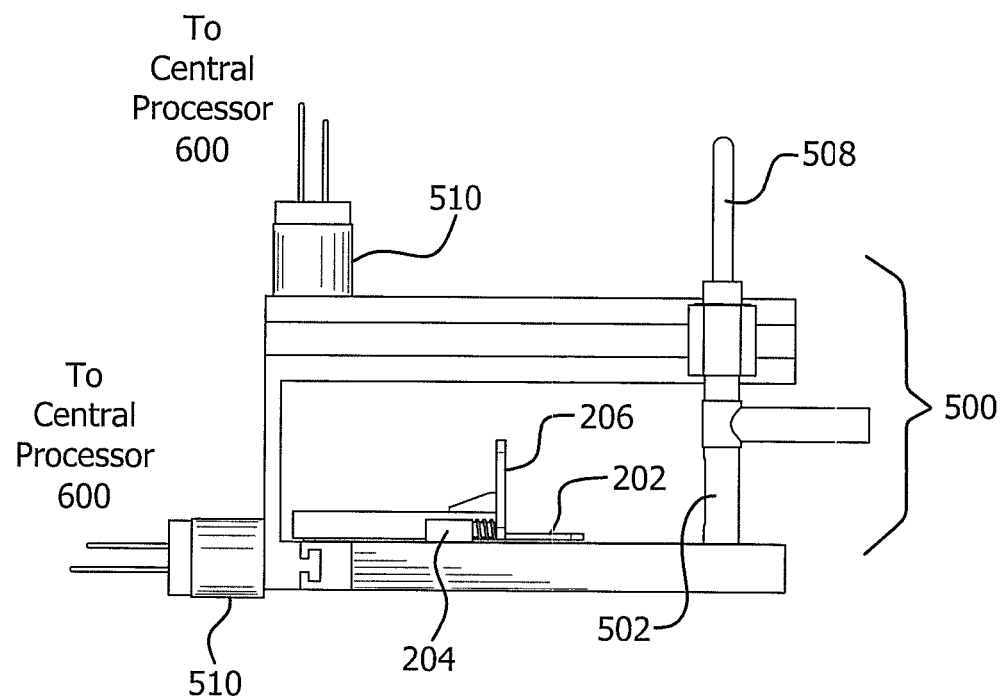
FIG. 6 is a front view of exemplary embodiments of a cutting support mechanism, imaging stage and cutting armature.
Figure 7:
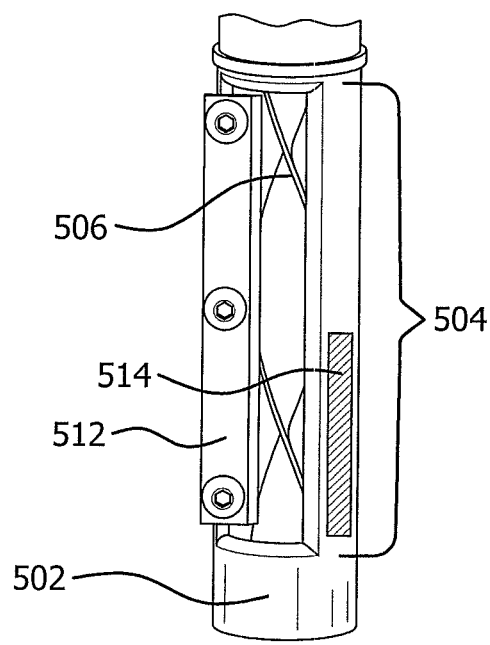
FIG. 7 is a detail view of an exemplary embodiment of a cutting armature.
Figure 8:
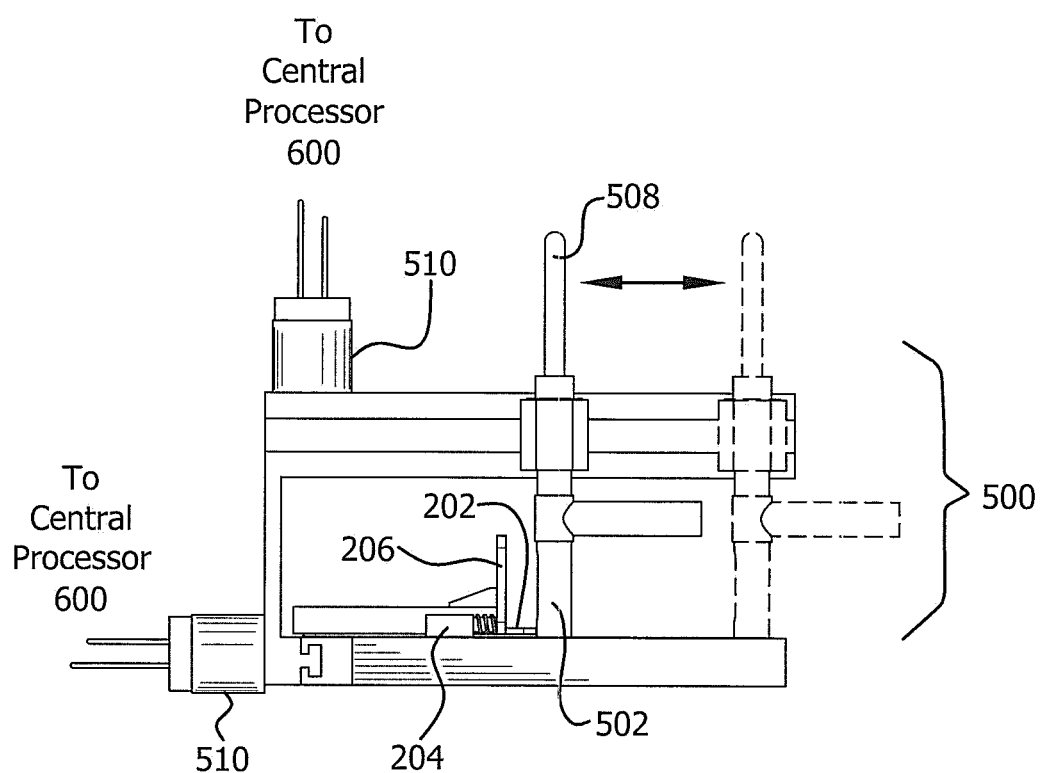
FIG. 8 is a front view of exemplary embodiments of a cutting support mechanism, imaging stage and cutting armature, showing movement of the cutting armature.
Figure 10:
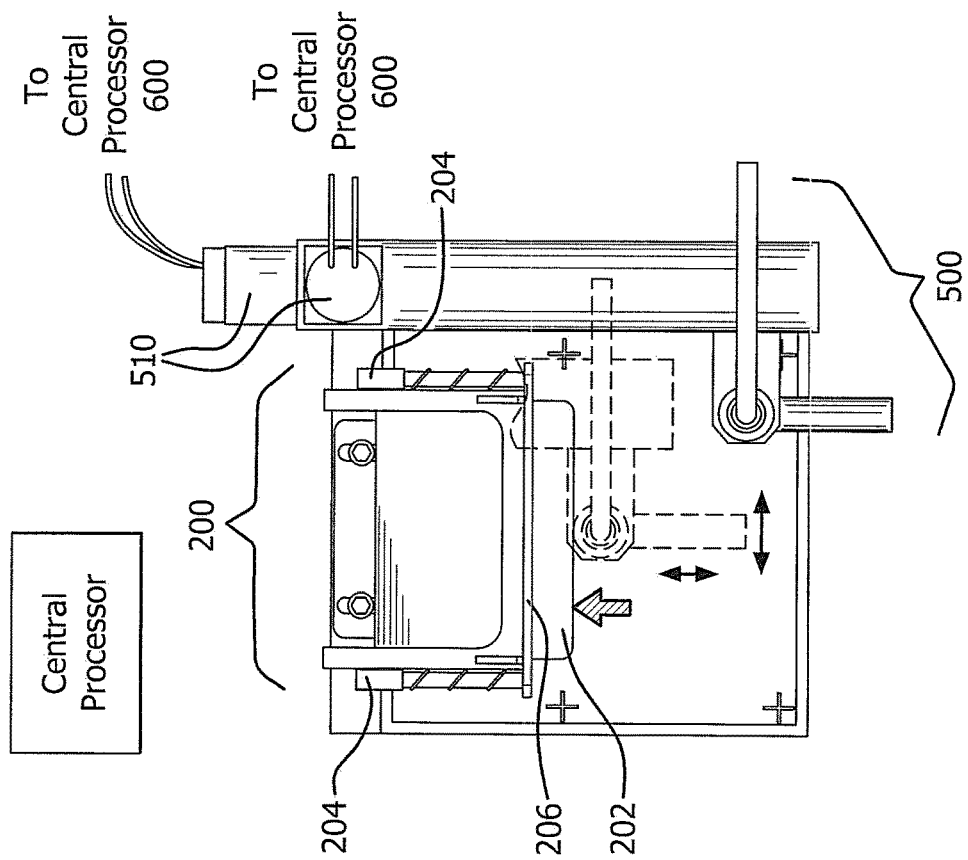
FIG. 10 is an overhead view of an exemplary embodiment of a cutting support mechanism, imaging stage and cutting armature, showing movement of the cutting armature and cutting support mechanism.
Figure 9:
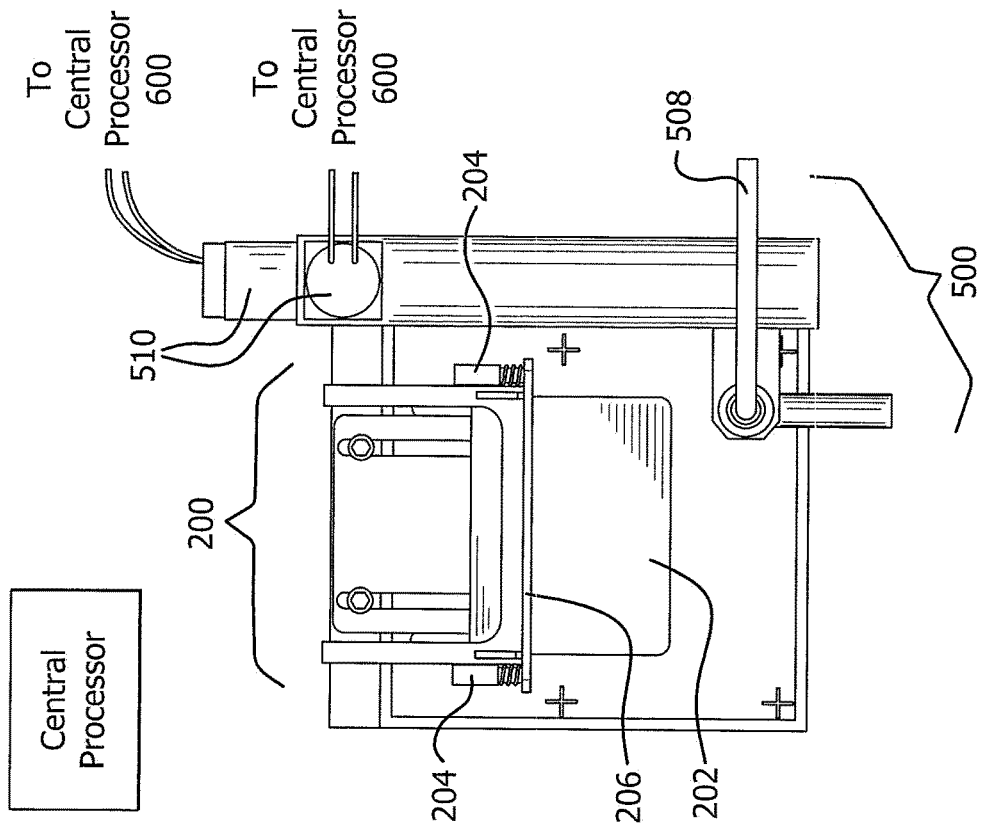
FIG. 9 is an overhead view of an exemplary embodiment of a cutting support mechanism, imaging stage and cutting armature.
Figure 11A:
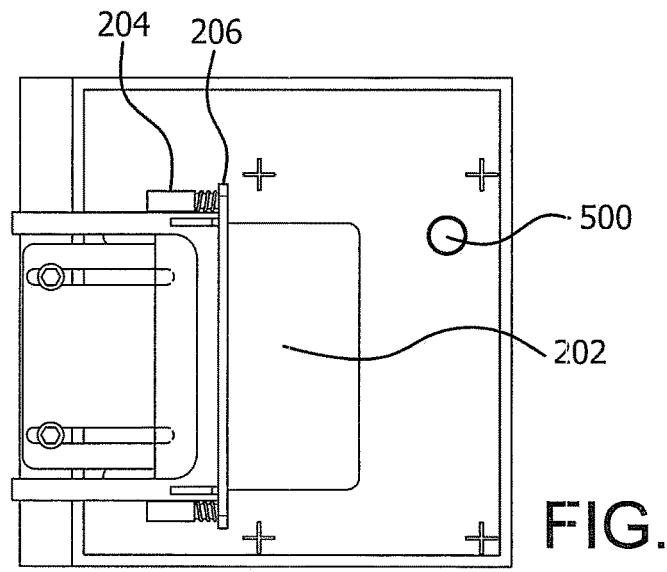
FIGS. 11A, 11B and 11C are overhead views of an exemplary embodiment of a cutting support mechanism, imaging stage and cutting armature, showing movement of the cutting armature and cutting support mechanism.
Figure 11B:
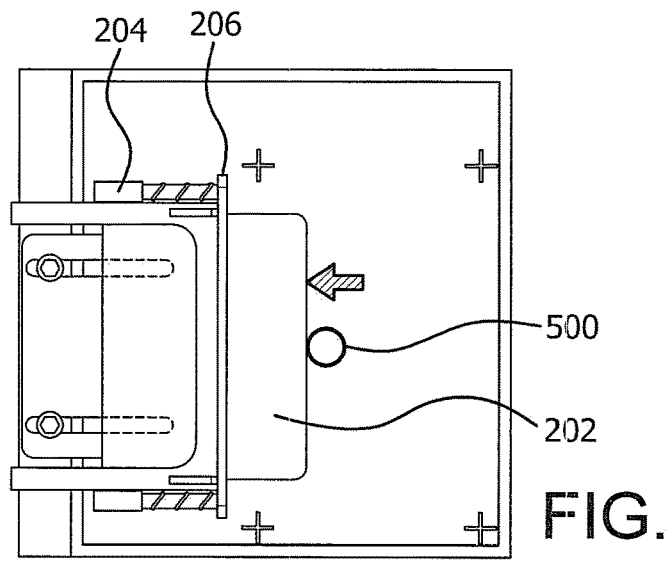
Figure 11C:
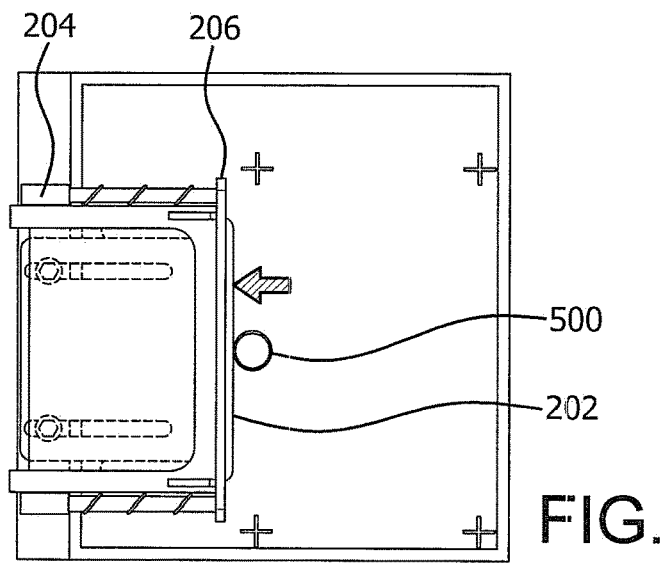

As illustrated in FIGS. 6, 7 and 8, the cutting armature 500 may include a hollow cylindrical chamber 502 including an axial slit or opening 504 and cutting structure 506 which could be a laser cutter or a rotating blade positioned inside the chamber so that leaves or other plant material that slip into the axial slit 504 are cut by the cutting structure 506 and thus severed from the plant stem 106. Preferably, a source of suction or lower air pressure 508 is also applied to the interior of the cylindrical chamber 502 so that leaves, stems, seeds and other plant parts that come into close proximity with the cylinder 502 are sucked into the axial slit 504 and then severed when the laser or rotating blade 506 passes across it. The source of low-pressure air 508 may be a typical household or industrial wet/dry vacuum, for example. When the cutting structure 506 is a rotating blade, the blade may be in the shape of an elongated helix, for example, and may be constructed so as to permit easy replacement when the blade inevitably gets dull from use. The cylindrical chamber may also include a stationary blade 512 located adjacent to the axial slit 504 with its cutting edge positioned in close engagement to the cutting edge of the rotating blade 506. The suction or lower air pressure source 508 then serves to remove the waste trimmings from the cylindrical chamber 502, where their continued presence might otherwise slow the cutting process. Preferably, the waste trimmings are conveyed by the air flow from the cylindrical cutting chamber 502 to a waste cup or filter cup (not included in FIGS.), where they can be collected and removed at an opportunity convenient to the machine operator. These waste trimmings may be discarded or saved for further processing (for example, *cannabis* oil extraction) to remove the relatively low concentration of cannabinoids from these parts of the plant. The cutting armature 500 may also comprise a mechanical scissors, shears, blade or any equivalent mechanism for cutting, grinding or removing plant material. A mechanical scissor, for example, may utilize a single or double acting pneumatic cylinder for actuation.

Figure 5:
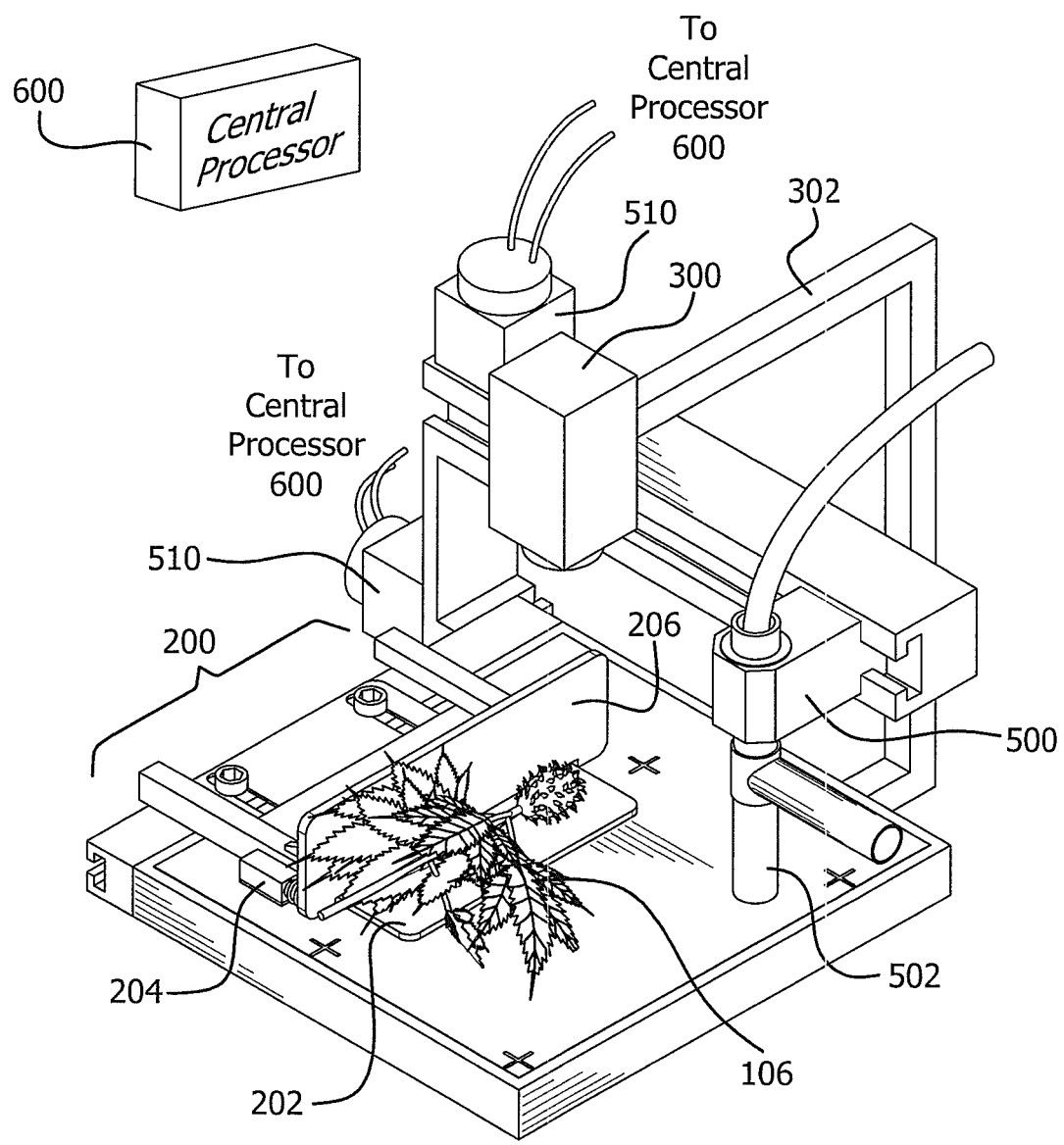
FIG. 5 is a front perspective view of exemplary embodiments of a cutting support mechanism, imaging stage and cutting armature.

As illustrated in FIGS. 4-5, the cylindrical chamber 502 of the cutting armature 500 is oriented along an axis that is substantially perpendicular to the plane of the imaging stage 400 and perpendicular to the axis of the plant stem 106. One end of the cylindrical chamber 502 slides along the surface of the imaging stage 400, while the other end is connected to a mechanism 510 for moving the cutting armature to any specified location or locations on the surface of the imaging stage. The mechanism 510 for moving the cutting armature may include motors, belts, gears and a communications circuit for receiving electrical signals or instructions from the central processor 600 (or some intermediate device in communication with the central processor 600) and translating these signals into movement of the cutting armature 500. The mechanism 510 may also include motors and linkages for rotating the axial slit 504 in the cylindrical chamber 502 to another position. This would enable the central processor 600 to tilt the slit's opening clockwise or counterclockwise along the long axis and thereby enable the cutting armature 500 to be more accurate in trimming certain areas of the plant stem 106, such as right near the flower. During the imaging process, the central processor 600 may give instructions for moving the cutting armature 500 away from the plant stem 106 so that the position of the cutting armature does not overlap or otherwise interfere with the image of the plant stem to be trimmed. The cylindrical chamber 502 of the cutting armature 500 may also include capacitive, resistive, touch or pressure sensitive sensors 514 (FIG. 7) for the purpose of gathering additional data about the plant stem or trimmed areas, for example the water content of the plant stem. Alternatively, the cutter could consist of a whip mechanism, for example a thin piece of wire or plastic rotating at a high speed, just as a garden weed trimmer. Alternatively, the cutter may be a non-contact non-mechanical device, such as a $CO_2$ laser or other laser source.

FIGS. 22-26 illustrate an alternative embodiment of an automated plant trimmer, including the following principal structures, each described in greater detail below: a transport mechanism 100, a camera 300, an imaging stage 400 and a cutting armature 500. As in the embodiment described above, the embodiment depicted in FIGS. 22-26 is a robotic transport and plant trimming system that uses data gathered by the camera 300 and other sensors and instructions provided by a central processor (or some intermediate device in communication with the central processor) to guide a cutting armature 500. The transport mechanism 100 includes a series of cars 102 mounted to a mechanically driven conveyor system 104. Each car 102 holds one or more plant stems 106 in a rotatable chuck or collar 108 for gripping and supporting the plant stem or stems as the car 102 travels along the conveyor system 104 and into the correct position for plant trimming The chuck 108 rotates along an axis that corresponds approximately to the long axis of the plant stem or stems mounted in the chuck. The chuck's rotation is driven through a friction or gear wheel system 110 that engages a drivewheel when the car is positioned in the plant-trimming position. The drivewheel is driven by a motor 112 controlled by electrical signals or instructions received from a central processor (or some intermediate device in communication with the central processor). The conveyor system is also driven by a motor 114 controlled by electrical signals or instructions received from the central processor (or some intermediate device in communication with the central processor).

As illustrated in FIGS. 22-26, there is no cutting support mechanism as in the embodiment described above, as the plant stem 106 hangs vertically from the car 102 and the chuck 108, which reduces the potential for the plant stem to droop or bend out of position.

Figure 22:
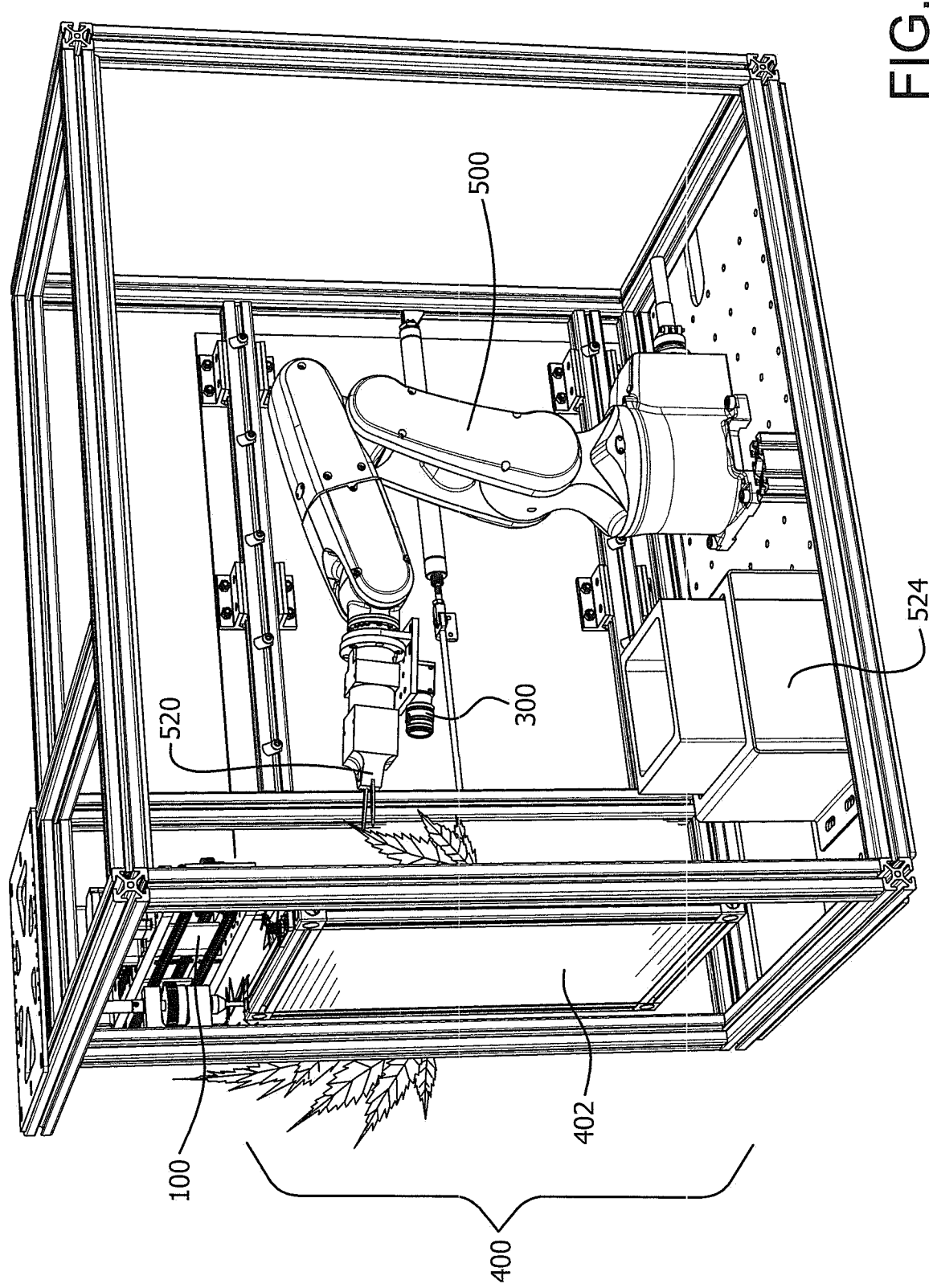
FIG. 22 is a side perspective view of a second exemplary embodiment of an automated plant trimmer.
Figure 23:
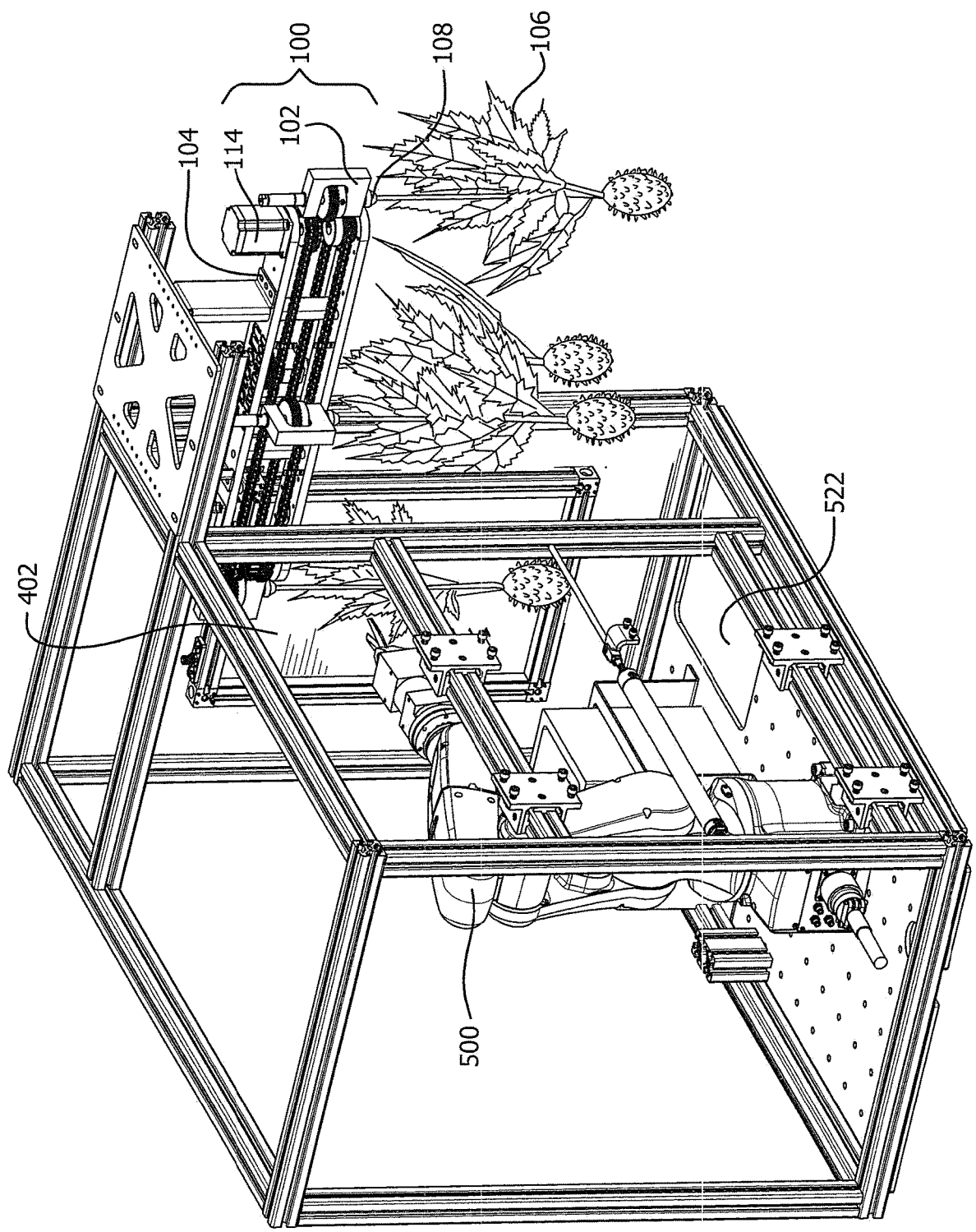
FIG. 23 is a front perspective view of a second exemplary embodiment of an automated plant trimmer.
Figure 24:
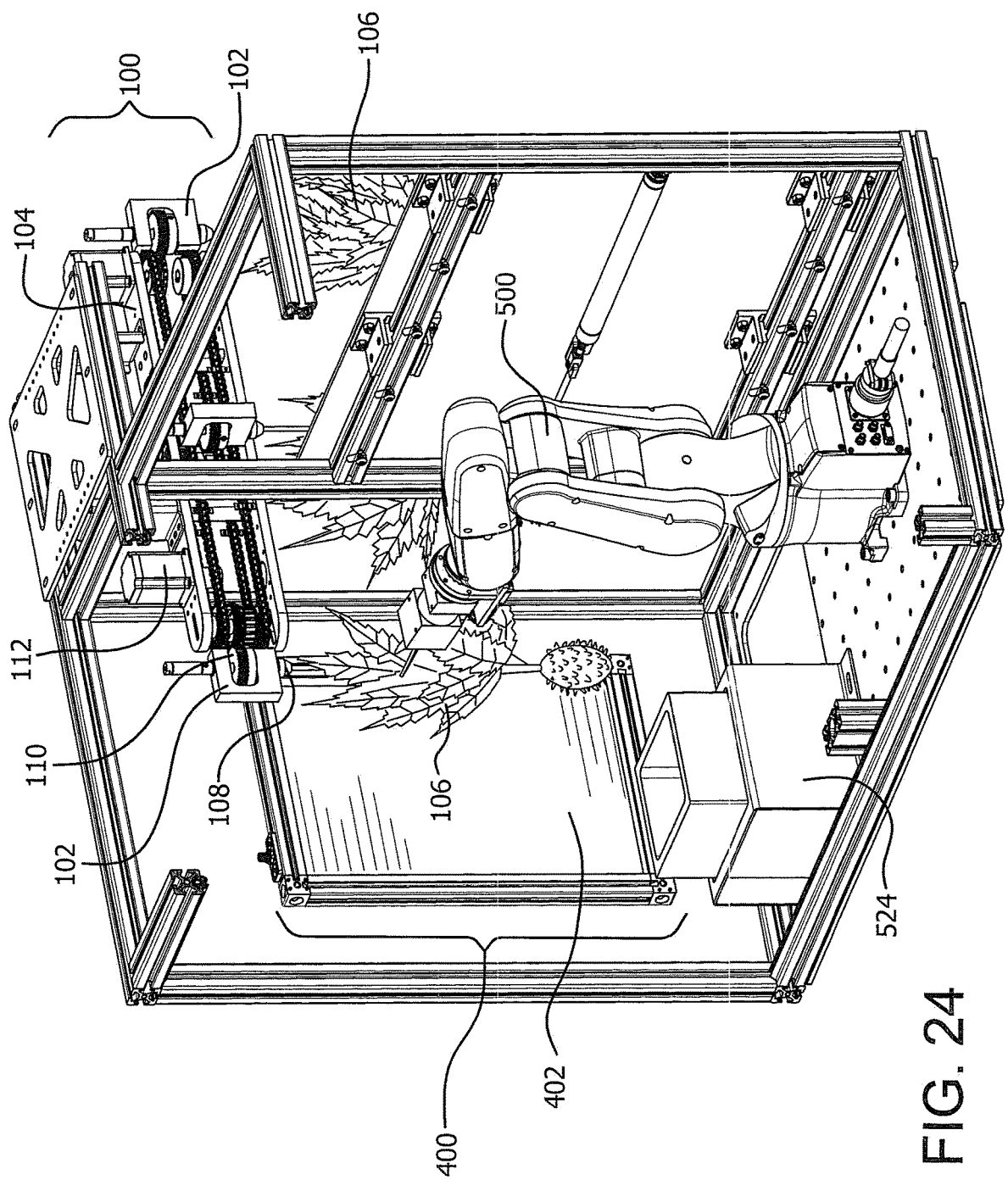
FIG. 24 is a rear perspective view of a second exemplary embodiment of an automated plant trimmer.
Figure 25:
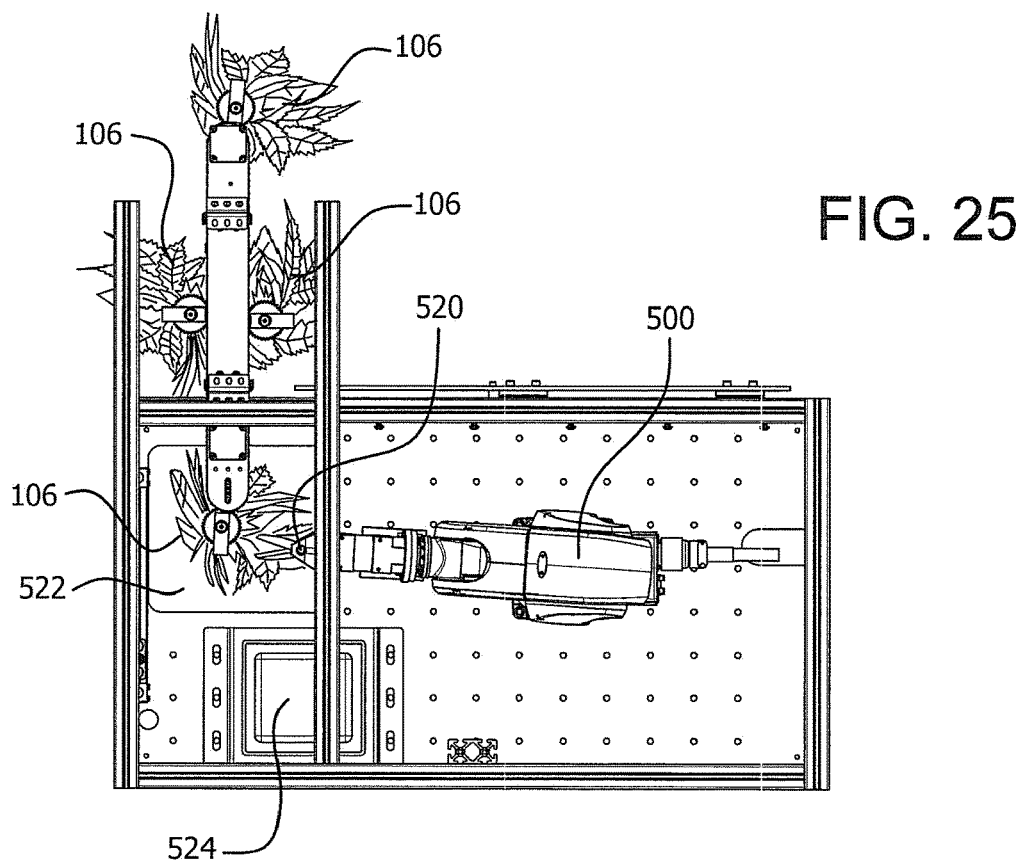
FIG. 25 is a top view of a second exemplary embodiment of an automated plant trimmer.
Figure 26:
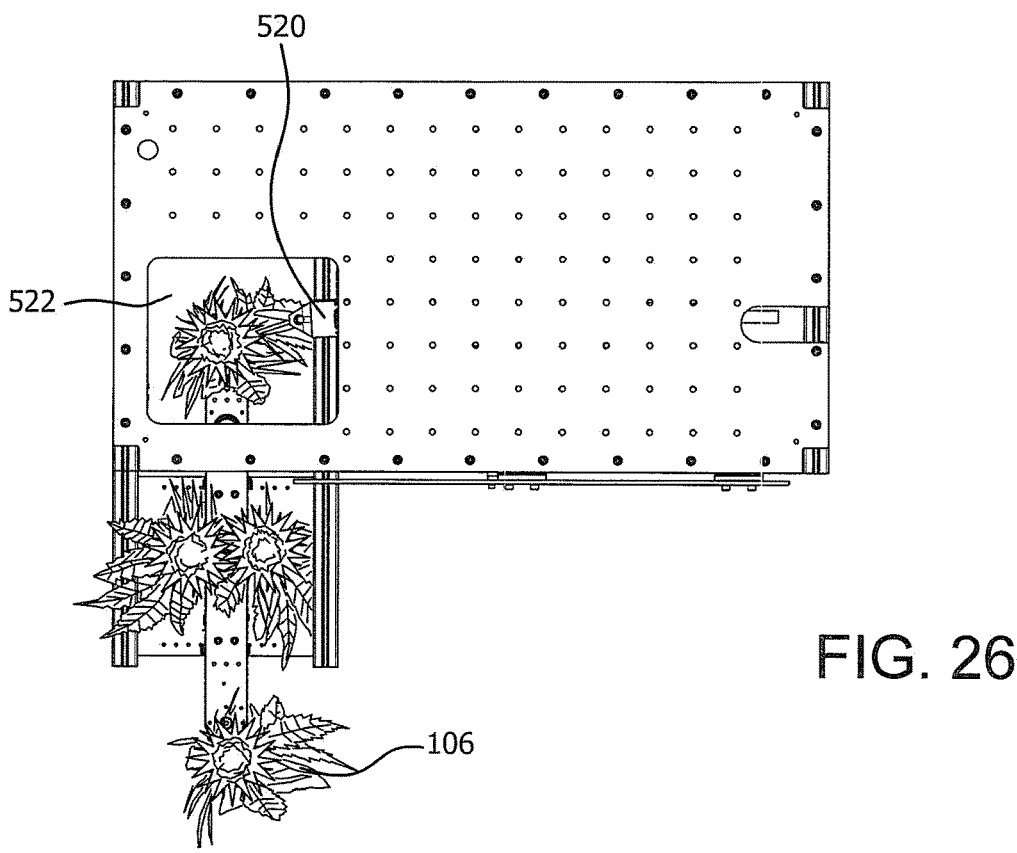
FIG. 26 is a bottom view of a second exemplary embodiment of an automated plant trimmer.

As shown in FIG. 22, the camera 300 in this embodiment is mounted directly to the cutting armature 500, where it can be moved to different positions and angles of view, thereby improving the detail and accuracy of the trimming process. Behind the untrimmed plant stem 106 is the imaging stage 400. The imaging stage 400 includes a backlighted surface 402 for illuminating the plant stem to be imaged and trimmed, which may also transmit at a specific wavelength or color to properly differentiate the plant, for example a blue or white light. Additionally, the backlighted surface 402 may be augmented or replaced by a front light, ultraviolet light, infrared light, LED, quartz halogen, fluorescent, xenon strobe or any other form of light source. The lighting system may also use other forms of filtered, colored or specialized lighting, such as infrared filtering, ultraviolet filtering, laser or coherent light sources or other forms of light beneficial for image capture.

As illustrated in FIGS. 22-26, the cutting armature 500 may include six-axis robotic armature with a mechanical scissor 520 utilizing a single or double acting pneumatic cylinder for actuation. The plant stem is positioned so that trimmings from the cutting process will fall into an opening or chute 522 in the floor of the device for collecting such material for further processing or disposal. In the proximity of the cutting armature 500, there may also be provided an ultrasonic solvent bath 524, where the cutting armature may dip the mechanical scissor 520, blade or other cutting implement for cleaning and removing of plant residue.

As illustrated in FIGS. 22-26, the cutting armature includes a mechanism for moving the the mechanical scissor 520 to any specified location or locations on the untrimmed plant stem. The mechanism for moving the cutting armature may include motors, belts, gears and a communications circuit for receiving electrical signals or instructions from the central processor (or some intermediate device in communication with the central processor) and translating these signals into movement of the cutting armature 500. During the imaging process, the central processor may give instructions for moving the cutting armature 500 away from the plant stem 106 so that the position of the cutting armature does not overlap or otherwise interfere with the image of the plant stem to be trimmed. The end of the cutting armature 500 may also include capacitive, resistive, touch or pressure sensitive sensors for the purpose of gathering additional data about the plant stem or trimmed areas, for example the water content of the plant stem.

The embodiments depicted in the attached FIGS. operate as follows.

As illustrated in FIGS. 2, 3 and 12, untrimmed plant stems 106 are loaded into chucks 108 in the transport mechanism 100. The process of loading an untrimmed stem 106 into each chuck 108 may be accomplished by hand or using an automatic loading mechanism, which may include jaws or fingers for gripping an individual plant stem from a hopper or other form of supply system, pushing it into the opening of an available chuck and then releasing the plant stem as the chuck grips it.

The cars 102, each including a rotatable chuck 108 and an untrimmed plant stem 106, are then moved by the conveyor system 104 from the loading/unloading area 116 and into the plant-trimming position 118. Upon arriving at the correct position, the conveyor system 104 is halted and the rotation mechanism of the chuck 110 is engaged with a drive wheel driven by a motor 112 controlled by electrical signals or instructions from the central processor 600 (or some intermediate device in communication with the central processor).

As illustrated in FIG. 5, when the plant stem 106 reaches the correct plant-trimming position 118, the stem 106 is also supported in position by the transparent platform 202 of the cutting support mechanism 200, which keeps the plant from drooping or bending out of the correct orientation while imaging and trimming are being done. This support mechanism may be removed where, for example, the plant stem is oriented vertically, as shown in FIGS. 22 to 26, or on a stationary or moving conveyor.

As illustrated in FIG. 13, in the plant-trimming position 118, the plant stem 106 is positioned between the camera 300 lens and the imaging stage 400. The camera 300 captures one or more images of the plant stem framed in front of the imaging stage 400. The plant stem 106 may also be rotated while the camera 300 captures images from different angles in order to provide the system with several choices for the best orientation of the plant stem during trimming. Each of the images captured from a different angle would be processed and evaluated using one or several of the steps described below.

Image processing includes the following steps, which may be combined in any order or used separately to create a trim map—that is, a database of flower and leaf positions that instructs the cutting armature 500 where to cut in order to trim away leaves while protecting the more valuable flowers. Basically, the image processing steps rely upon a series of geometric and other physical "markers" that are associated with the position of flowers, leaves or stems and then assigns a probability to each position based on the fit of these geometric markers. The entire map of probability values, combined from each of the various image processing steps, is then used to create the trim map. Edge detection, the Sobel-Feldman operator or filter, or other machine vision techniques may be utilized in this process. Additionally, machine learning and artificial intelligence techniques, such as, but not limited to supervised learning, wherein the algorithm has been trained with numerous sample images, may be used to produce increase confidence and accuracy in the image processing algorithms. Supervised training of these networks would include, for example, identifying the location of sugar and fan leaves, as well as flowers and branches on a *cannabis* plant. After entry of numerous images showing correctly identified features, the computer is trained through software algorithm to recognize similar organic regions within a *cannabis* branch or plant, for example. This improves upon the accuracy and confidence of previously and here on described algorithms.

Figure 14:
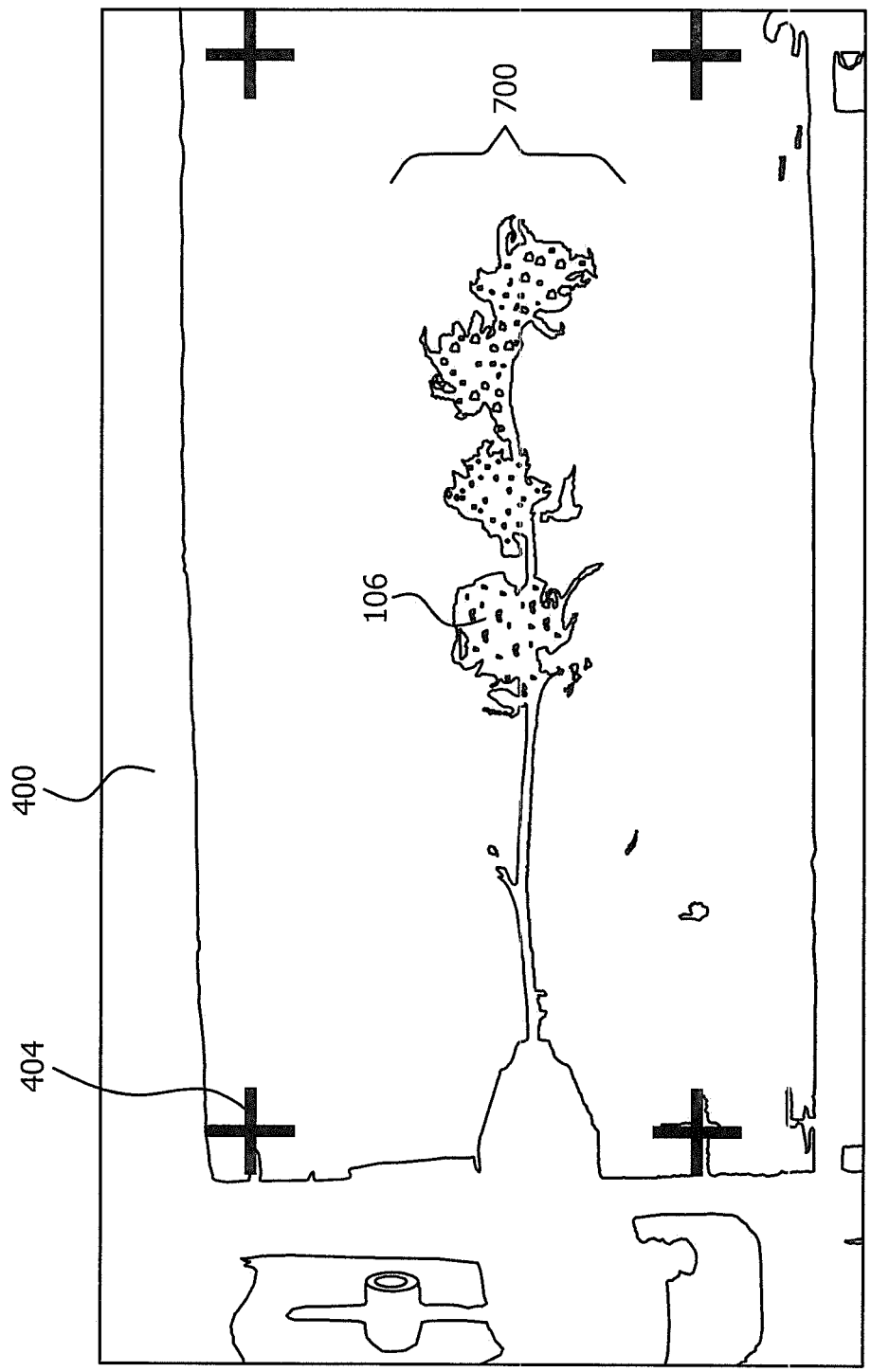
FIG. 14 is an image of a plant stem prior to trimming, as captured by a camera.
Figure 15:
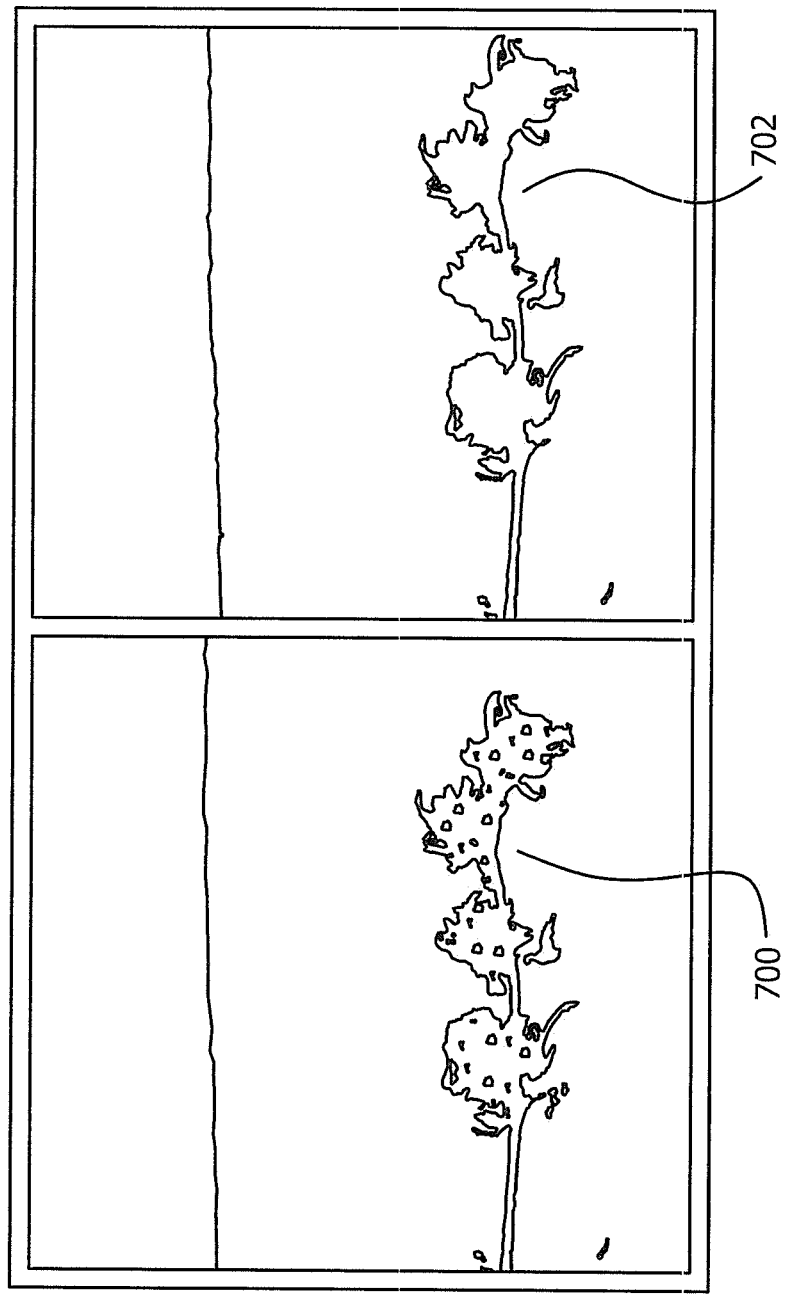
FIG. 15 is a comparison of images of a plant stem in the original state and in the silhouette or outline state.

As illustrated in FIGS. 14 and 15, the original image captured by the camera 300 includes both the plant stem 106 and the reference markers 404 on the imaging stage 400. The original image, however, is typically too complicated and detailed for the image processing steps, and so the original image may be simplified into a silhouette 700 by increasing the image contrast and assigning a value for each pixel or group of pixels as either "on" or "off," which corresponds to either white or black. This silhouette is then further simplified using morphological image processing to locate and either open or close small groups of continguous pixels that do not match the value of a surrounding field. After this step, the original image 700 is reduced to a simple silhouette or outline shape 702, which is the starting point for each of the leaf and flower recognition steps that follow.

Figure 16:
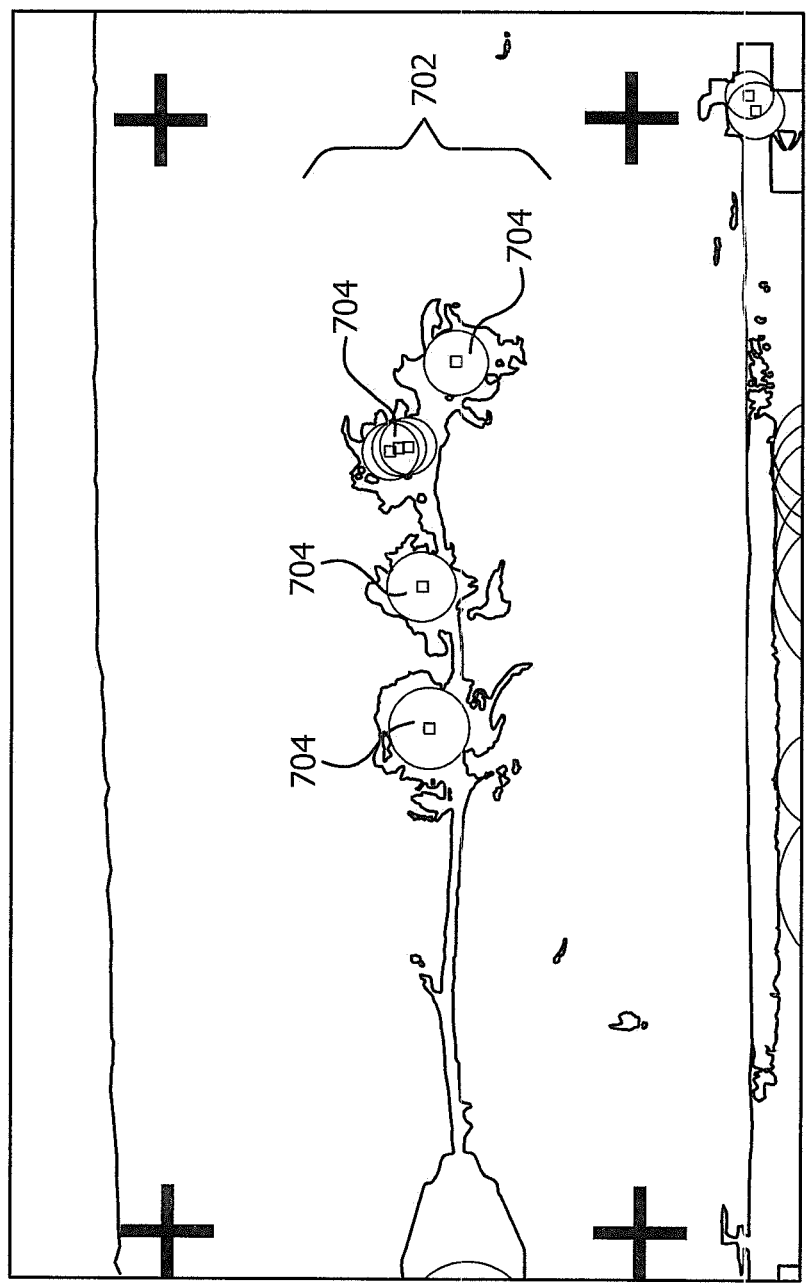
FIG. 16 is an image illustrating the shape-fitting process against a silhouette image of a plant stem prior to trimming.
Figure 17:
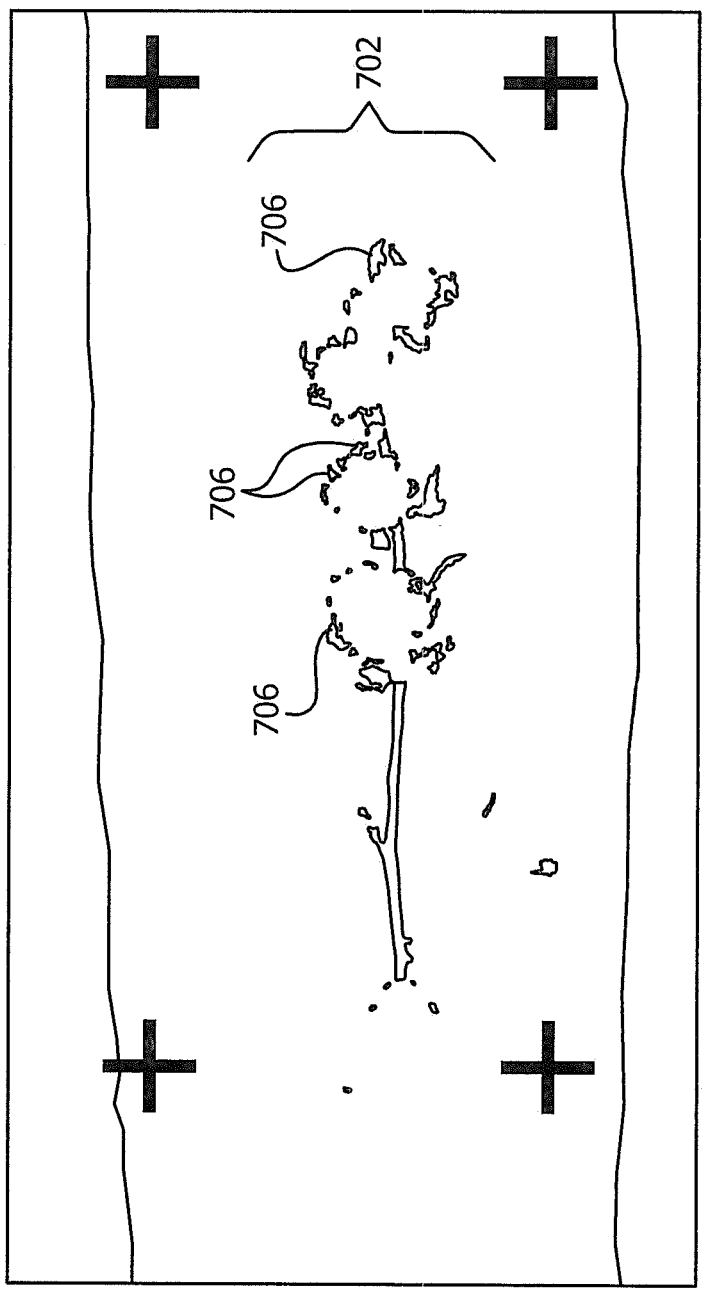
FIG. 17 is an image illustrating the shape-fitting process after subtraction of certain portions of the image previously covered by circles or other shapes.

As illustrated in FIGS. 16 and 17, one recognition step, called shape fitting, is an iterative, software-controlled computation whereby the central processor locates the largest continuous area of darkened pixels on the silhouette image 702 (not including the reference marks) and then computes and draws the largest circular area 704 that will fit entirely inside this area of darkened pixels. Specifically, by altering the intensity of an array of individually-addressable LEDs that form the imaging stage 400, the central processor 600 may be able to distinguish parts of the plant stem 106 that are dense or opaque to light, which are typically the flowers. If an area of dense plant material is identified as having a high probability of being a flower, further analysis of its shape is performed. Flowers typically form round, elongated geometries characterized by a relatively smooth surface. A "circle fit" image processing algorithm is used to fit circles of independent diameters into areas of contrast on the processed image. For a circle to fit, the entire shape must be enclosed—that is, no light or almost no light is passing through the circular region. The result is an image of a flower with circles of varying diameters over-laid, as shown in FIG. 16. The positions and radii of the circles 704 are analyzed for their proximity to each other, their overall size, and their positions with regard to the stem location. If a grouping of circles 704 forms a roughly elliptical or oval region, is located in the region of the branch or stem, and is opaque or nearly opaque (that is, little porosity), it is given a score and identified as either one flower, multiple flowers, or other plant material.

As illustrated in FIG. 17, the central processor may also subtract or disregard the area inside the circles, search the remaining shapes 706 again to determine the next largest continuous area of darkened pixels available on the image, and then compute and draw the largest circle that will fit entirely inside this area. What remains after the circle-fitting step is the silhouette image 702 marked with a series of circles 704 that correspond to most or all large areas of darkened pixels on the silhouette image. These large areas of darkened pixels on the silhouette image may correspond to the rounded or bulbous flower areas of the untrimmed plant stem, and the circles fitted to these areas of darkened pixels may be used in the creation of a trim map to mark the boundaries where the cutting armature should be stopped to avoid damage to this part of the plant. Smaller areas of pixels 706 remaining after the deduction of the circular or oval areas may correspond to leaves, stems and other areas to be trimmed. To determine which of these circles, shapes, groups of shapes, and so forth, represents a singular flower, multiple flowers or other plant material, statistical analysis is completed to provide a probability score corresponding to each region on the plant. This score may be included in the information collected in the trim map, as described in greater detail below.

The shape-fitting step may be modified by using other shapes, including ellipses, ovals, triangles, other polygons or irregular blobs. The shape-fitting step may also be modified by permitting a certain amount of overlap in the boundaries of the circles, thereby permitting circles drawn on the silhouette image to overlap each other or the boundaries of the dark and light pixels. Permitting a certain amount overlap may enable the circles to be fitted somewhat "tighter" to the contours of flower shown in the silhouette image.

Figure 20:
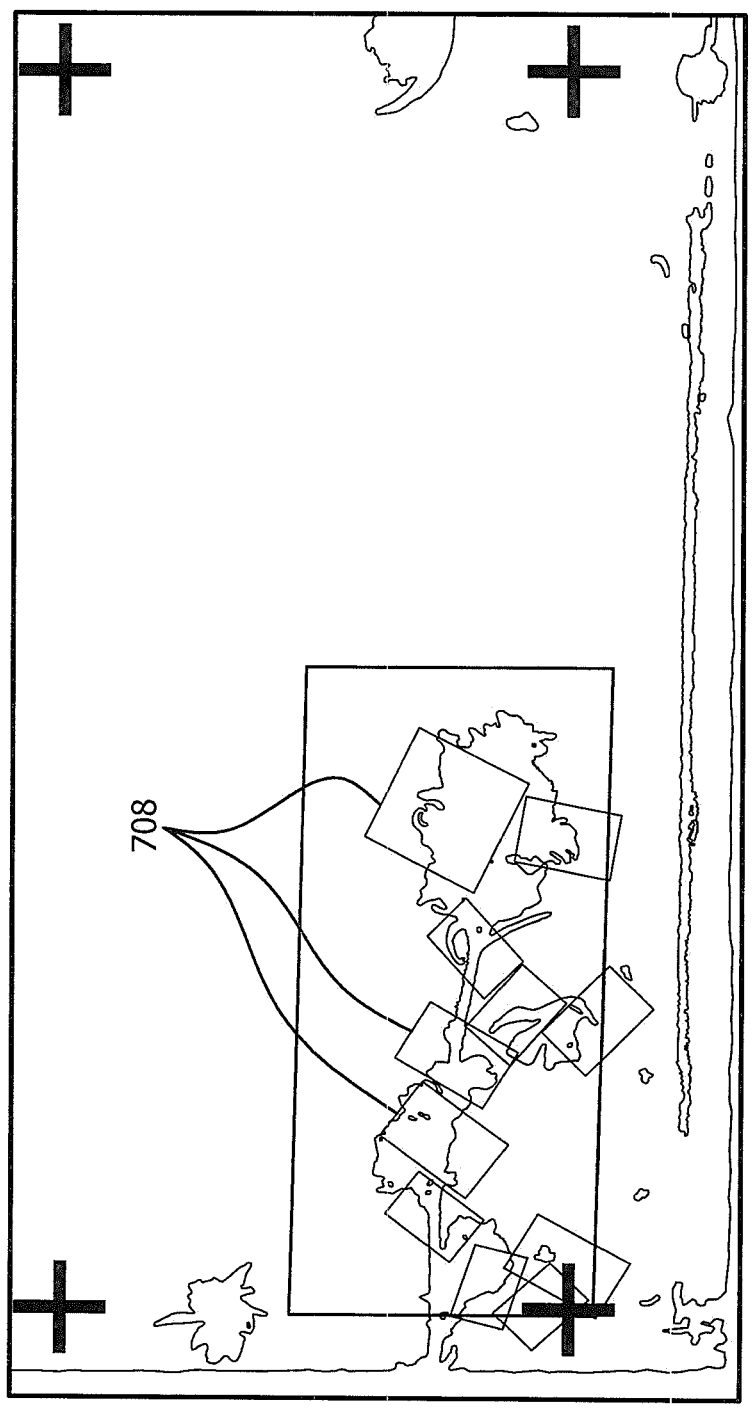
FIG. 20 is an image illustrating the shape recognition process against a silhouette image of a plant stem prior to trimming.

As illustrated in FIG. 20, another recognition step, called pattern recognition, is also an iterative, software-controlled computation whereby the central processor 600 divides the entire boundary between lighted pixels and darkened pixels on the silhouette image 702 into discrete sections 708 and then compares the shape of each section's boundary line to one or more reference shapes showing boundaries typical of plant leaves. The central processor 600 also adjusts the rotation and scale of the reference shape or shapes to find the closest possible fit to the boundary section 708 being evaluated, with the closeness of the fit judged by the difference between the two boundary lines, as measured in total area or number of pixels. When the central processor 600 finds a close fit between the boundary section 708 being evaluated and one or more reference shapes, the boundary section 708 is marked for cutting on the trim map. Further statistical analysis is completed at this step to confirm that the identified shapes have a high probability of matching those of a leaf. The statistical analysis involves a comparison of the length-to-width ratio of the flower shape as compared to the direction of the branch on which the flower shape is located. If the flower shape is longer along the axis of the branch than it is wide, then it is more likely to be an actual flower, whereas if the flower shape is shorter along the axis of the branch than it is wide, then it is more likely to be an actual leaf.

Another recognition step, called lighting modulation, incorporates the use of the LED lighting of the imaging stage to provide an extremely bright backlit surface. First, an image with average light intensity is taken. Then, the LED lighting is brightened significantly, causing leaves and other thin plant material to become largely translucent to the camera. Then the dense or thick materials, such as stems and flowers, remain visible to the camera. These two images are superimposed on each other, which removes the dense areas of flowers and stems seen in both images, while leaving only the features that appeared translucent to the camera in the second image. Because leaves allow partial transmission of very bright light as compared to flowers, which remain opaque, the process of comparing images using different light intensities gives the central processor reliable information about which portions of an image correspond to leaves as opposed to flowers. The features identified as leaves in this step may also be further analyzed with one of the other image processing steps described herein.

Figure 21:
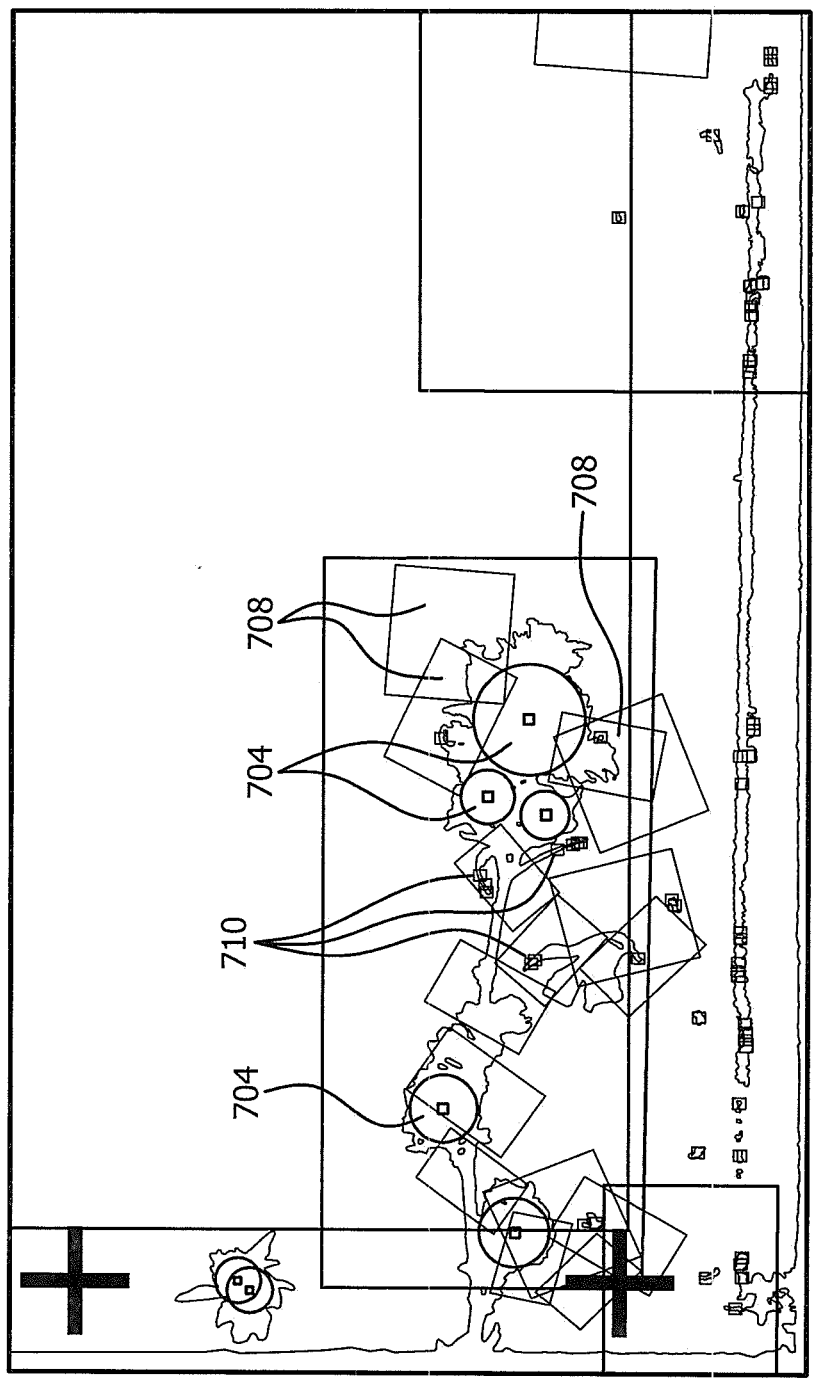
FIG. 21 is an image illustrating several image processing steps (shape fitting, pattern recognition and leaf tip recognition) against a silhouette image of a plant stem prior to trimming.

As illustrated in FIG. 21, another image processing or recognition step, called leaf-tip recognition, is also an iterative, software-controlled computation whereby the central processor locates small areas of darkened pixels surrounded on more than one side by larger areas of lighted pixels and then computes and fits a small circle within each darkened area 710, each small circle identifying the tip of a leaf for trimming. Leaf tips have a characteristic shape—small, thin areas that narrow to a sharp, triangular point—that can be located by the central processor using simple search algorithms. The central processor then marks the position of each leaf tip 710 on the trim map for cutting. Again, statistical analysis and expected shape comparisons are used at this step to confirm that the identified shapes have a high probability of matching the location of actual leaf tips.

Figure 18:
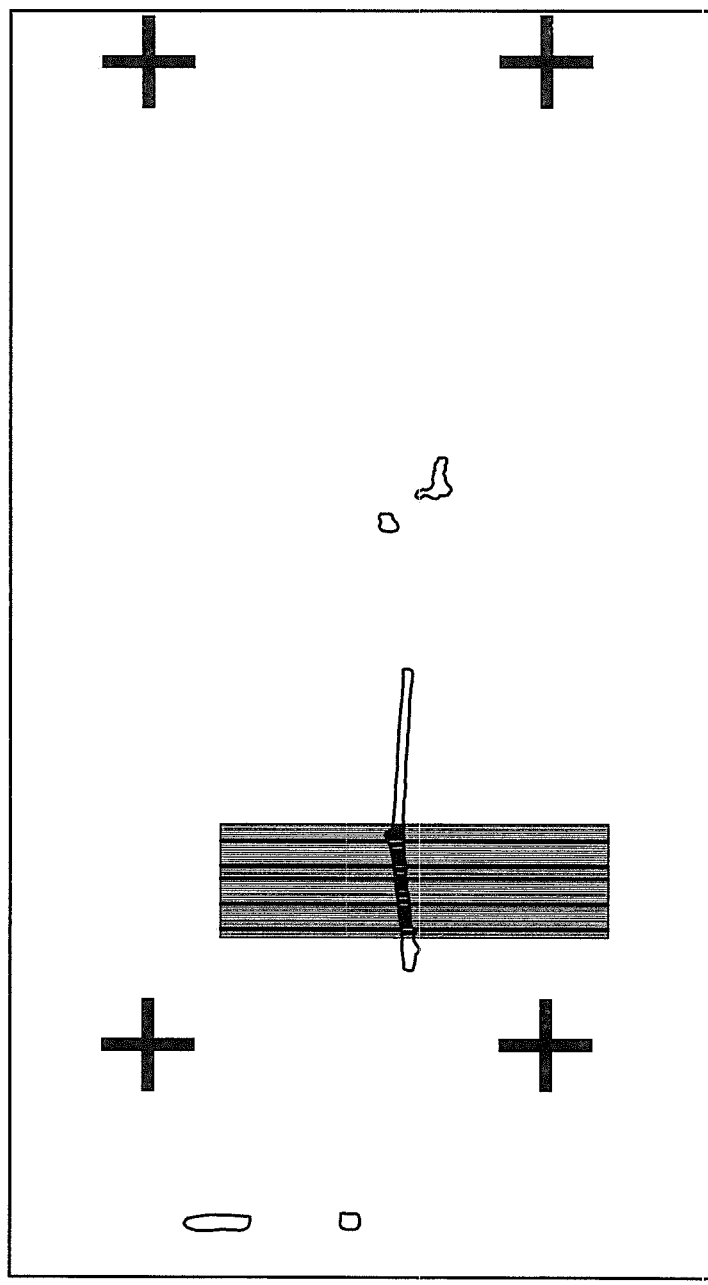
FIG. 18 is an image illustrating the branch identification process against a silhouette image of a plant stem prior to trimming.

As illustrated in FIG. 18, another image processing or recognition step, called branch identification, involves the identification of branches and stems through the use of edge detection techniques to recognize straight lines of the plant stem images. Of course, very few branches or stems are straight in nature, and as such the process generally results in a number of discrete lines that must be knit together to describe a full branch section. To do this, a separate algorithm looks at the location of end points and start points of line sections. If, for example, an end point is in close proximity to a start point, the angle of the computed edges are similar, and there are no detected flowers at the intersection, these two lines are assumed to form a branch section. Several additional factors influence grading of individual edges, including the locations of leaves, smaller diameter stems or branches and flower locations.

Figure 19:
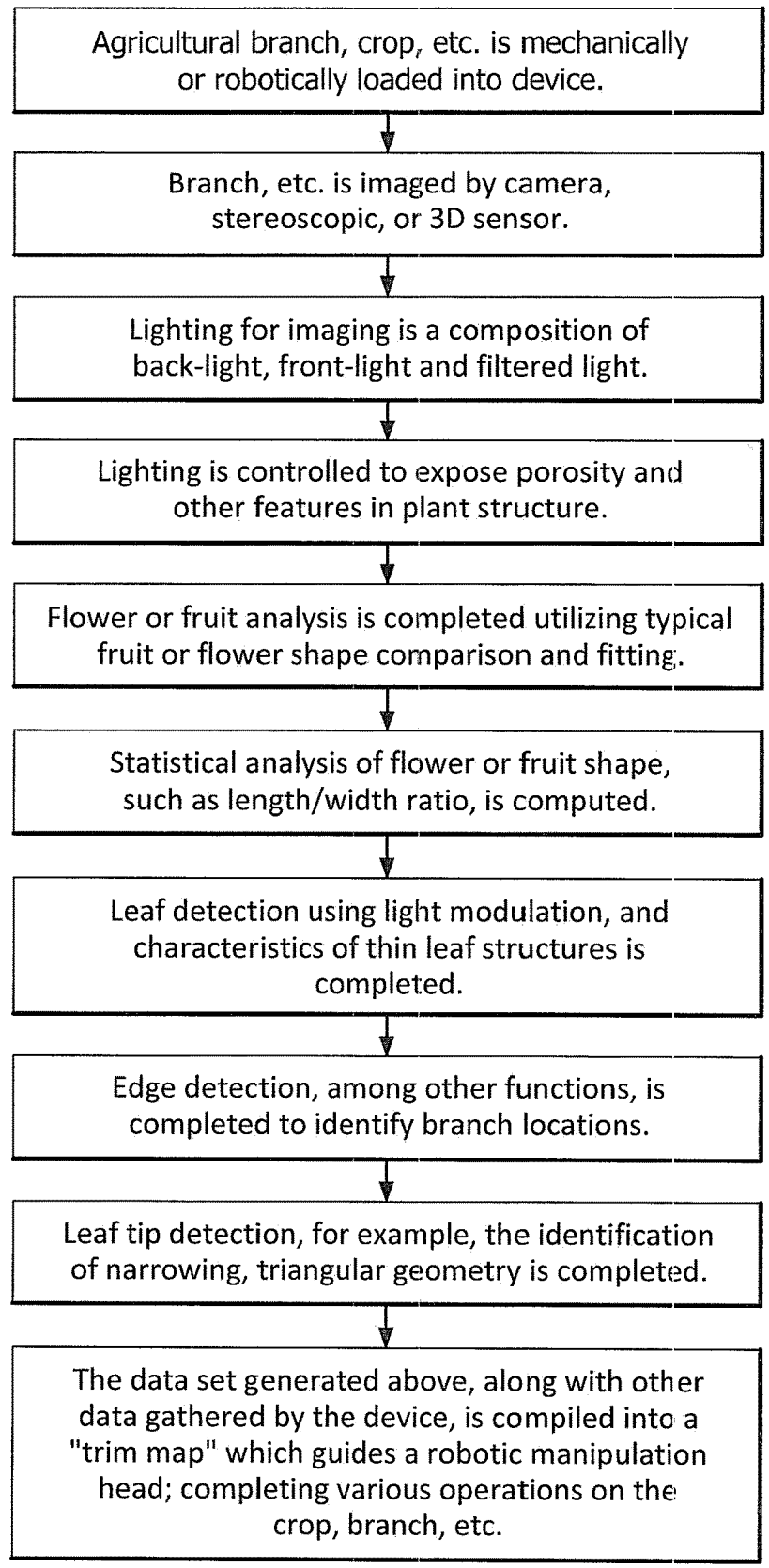
FIG. 19 is a flow chart illustrating the steps of an embodiment of image processing.

As illustrated in the flow-chart of FIG. 19, each of the image processing steps described above—shape fitting, pattern recognition, lighting modulation, leaf-tip recognition and branch identification—may be used alone or in combination with any of the other processing steps, or other steps, to create a trim map for guiding the cutting armature. Multiple image processing steps may be combined and applied to a single image to obtain a more accurate trim map, as illustrated in FIG. 21. The trim map includes information on the locations of areas of the plant stem to be removed through trimming and areas of the plant stem to be avoided during the cutting process. When the system utilizes more than one image processing step, the data from each image processing step may be combined using a probability function such that areas of the plant stem that are identified for cutting based on only one image processing method will be assigned a low "score" or "probability" for trimming while areas of the plant stem identified based on two or three image processing methods will be assigned a higher score or probability for trimming.

The trim map is used by the central processor to construct a pattern for moving the cutting armature 500 to various locations along the plant stem 106 and thereby trim the stem's leaves efficiently and automatically while avoiding any damage to the valuable flower and trichomes. Following this cutting pattern, the central processor 600 then moves the cutting armature 500 from the rest position at one side of the imaging stage 400 into various locations along the plant stem 106. The cutting armature's rotating blade 506 and vacuum system 508 are activated during this process so that as the slit or opening 504 of the cutting armature 500 comes into contact with various parts of the plant stem 106, the leaves at that location will be sucked very briefly into the opening 504 and trimmed off. As the cutting armature 500 moves close to the plant stem, the cylindrical chamber 502 may come into contact with and even push against the support platform 202. As stated previously, the support platform 202 is able to slide backwards in response to pressure from the cutting armature 500, and as soon as the cutting armature retreats, a bias spring or equivalent mechanism 204 connected to the support platform 202 moves the platform back into its original, extended position. Thus the support platform 202 is able to keep the plant stem 106 from bending or drooping throughout the imaging and trimming process without interfering with either function.

The trim map may also include instructions for rotating the slit 504 of the cutting armature 502, changing the angle between the long axis of the cutting armature and the axis of the plant stem 106, or changing the angle of scissors at the end of the cutting armature, which are ordinarily substantially perpendicular. Rotating the slit 504 or changing the angle of the cutting armature cylinder 502 or scissors in any axis may give the system additional capability for reaching "overhangs" or other difficult-to-trim areas of the plant stem 106 without damage to the flower or trichomes. The trim map may also include instructions for various automatic movements to assist in the trimming process. For example, the trim map may include instructions for the cutting armature 500 to move several times up and down (relative to the long axis of the plant stem) by 2 mm to account for the fact that the trim pattern disclosed through image processing may not correspond precisely to the locations of actual leaves. This brief 2 mm up-and-down movement does not risk any significant damage to the valuable parts of the plant stem and is effective in grabbing and trimming leaves that remain just outside of the cutting armature's reach at its original location on the trim map. Other automatic movements to assist the trimming process may also be added to the trim map by the central processor, such as making a slight rotation) (±5°) of the cutting slit or the plant stem.

Once the central processor completes the trimming stage (that is, after the processor 600 moves the cutting armature 500 through all the locations marked on the trim map for cutting), the central processor moves the cutting armature away from the plant stem and back to its "rest" position on the opposite side of the imaging stage 400. The central processor 600 may then capture another image of the plant stem 106 to compare to the image captured before the trimming process 700. This comparison serves to confirm that all the areas marked on the trim map have been correctly trimmed, and if the comparison discloses that trimming was not completed correctly, the central processor 600 may then engage the cutting armature 500 for a second pass at the plant stem 106 in the areas where trimming was incomplete.

Additionally, imaging may be accomplished continuously during the trimming process, whereby the plant stem 106 is imaged multiple times, the image is processed as described above and the trim map is altered with new information to account for changes in the plant stem, leaf position and progress by the cutting armature throughout the trimming process. Continuous and intermittent imaging may employ any number of sensors including digital photography cameras with CMOS and CCD sensors using visible, infrared and other spectra. Capacitive, resistive, touch and pressure sensors may also be used to augment the imaging information available to the central processor. Laser range finding, including without limitation LIDAR sensing, may also be used in scanning and differentiating features on the plant stem. Thus, the data collected and analyzed to determine and segment agricultural features and locations may not be limited to 2D data, but may also include 3D data gathered as a result of a structured light, laser range finding, or other method of obtaining data in 3D dimensions. This data is then processed in the form of a point cloud dataset.

After determining that the trimming process has been successfully completed, the central processor 600 then rotates the chuck 108 holding the plant stem 106 to another orientation, exposing an area of the plant that was not exposed or less exposed in the previous orientation. The amount of rotation will depend on the number of rotations chosen for each plant stem—that is, for one rotation cycle per plant, the plant will be rotated through 180 degrees; for two rotation cycles, 120 degrees; for three rotation cycles, 90 degrees, and so forth. Preferably, the central processor will make three to five of these rotation cycles for each plant stem.

Additionally, rotation of the plant stem 106 may be accomplished continuously during the trimming process, whereby the plant stem is rotated multiple times, the image is captured and processed at each point in the rotation as described above and the trim map is altered with new information corresponding to the differing views available as the plant stem is rotated and trimmed. Continuous rotating combined with continuous or intermittent imaging may permit the creation of a three-dimensional image of the plant stem and its leaves. Image processing would then proceed in the same manner as described above, but with three-dimensional shapes (such as spheres) replacing two-dimensional shapes (such as circles) in the description above.

After rotating the chuck 108 to a new orientation, the process of image capture, image processing, trimming and verification begins again, as described in detail above. After the last of the chuck rotations is completed and the successful trimming verified, the plant stem 106 is considered trimmed and the conveyor moves the trimmed plant stem 116 out of the way. Another untrimmed plant stem 106 is moved by the conveyor into the correct trimming position, and the process begins again on another stem.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

Moreover, it is to be appreciated that the terms "plant stem" and "plant" referred to herein are in the appended claims is to be interpreted broadly to include any harvested portion of any plant that may be used for any commercial or agricultural purposes, and includes without limitation any fruits, nuts, flowers, bulbs, leaves, heads, seeds, pods, shoots, vegetables or any other useful part of any plant or any portion thereof.

I claim:

1. An automated device for trimming an untrimmed plant stem comprising:
   a transport mechanism for holding and moving the plant stem;
   a camera and an imaging stage;
   a cutting armature having cutting structure for trimming the plant stem; and
   a central processor;
   wherein the transport mechanism moves the plant stem proximate to the imaging stage for image capture; the camera disposed toward the imaging stage to capture at least one image of the plant stem; the central processor receiving the at least one image from the camera to create a trim map using at least some data gathered from the at least one image; and the central processor moving the cutting armature as guided by the trim map to position the cutting structure against the plant stem for trimming the plant stem whereby the untrimmed plant stem is changed to a trimmed plant stem;
   wherein the transport mechanism includes at least one car mounted to a conveyor system, the car having a chuck to releasably hold the plant stem at the imaging stage; and
   wherein the chuck is rotatably mounted to hold the plant stem at different orientations, and the rotation of the chuck being driven by a motor receiving signals from the central processor;
   wherein the cutting armature includes a hollow chamber having an elongated generally vertical slit in its outer wall to provide access to the interior of the chamber, the cutting structure being mounted in the hollow chamber, a source of reduced air pressure communicating with the interior of the hollow chamber to draw in plant parts from the plant stem and removing the plant parts when the plant parts are cut from the plant stem, and the hollow chamber having a lower end which slides along the imaging stage and an upper end receiving control signals from the central processor.

2. The device of claim 1 wherein there are a series of cars on the conveyor system, and the chucks are mounted horizontally.

3. The device of claim 1 wherein there are a series of cars on the conveyor system, each car having a chuck and the chucks being vertically mounted, and the imaging station including a vertically mounted backlighted surface.

4. The device of claim 1 wherein the cutting structure is a laser cutter.

5. The device of claim 1 wherein the cutting structure within the hollow chamber is a rotating blade, a stationary blade being mounted adjacent to the slit, and the slit being axial.

6. The device of claim 1 wherein the hollow chamber is rotatable, and the hollow chamber having a sensor for gathering data about the plant stem.

7. The device of claim 1 wherein the cutting armature is a six axis robotic armature.

8. The device of claim 1 wherein the transport mechanism includes at least one car mounted to a conveyor system, the car having a chuck to releasably hold the plant stem at the imaging stage, the chuck being rotatably mounted to hold the plant stem at different orientations, the rotation of the chuck being driven by a motor receiving signals from the central processor, the imaging stage includes a backlighted surface to illuminate the plant stem, and reference markers being on the backlighted surface.

\* \* \* \* \*